# (12) United States Patent
Yagi

(10) Patent No.: US 10,508,560 B2
(45) Date of Patent: Dec. 17, 2019

(54) STATOR-VANE STRUCTURE AND TURBOFAN ENGINE

(71) Applicant: IHI Corporation, Koto-ku (JP)

(72) Inventor: Hiroyuki Yagi, Koto-ku (JP)

(73) Assignee: IHI Corporation, Koto-ku (JP)

(*) Notice: Subject to any disclaimer, the term of this patent is extended or adjusted under 35 U.S.C. 154(b) by 251 days.

(21) Appl. No.: 15/517,730

(22) PCT Filed: Oct. 2, 2015

(86) PCT No.: PCT/JP2015/078098
§ 371 (c)(1),
(2) Date: Apr. 7, 2017

(87) PCT Pub. No.: WO2016/056486
PCT Pub. Date: Apr. 14, 2016

(65) Prior Publication Data
US 2017/0306777 A1    Oct. 26, 2017

(30) Foreign Application Priority Data

Oct. 8, 2014   (JP) ................................. 2014-207323

(51) Int. Cl.
| | |
|---|---|
| *F01D 9/04* | (2006.01) |
| *F01D 5/14* | (2006.01) |
| *F04D 29/64* | (2006.01) |
| *F04D 29/54* | (2006.01) |

(Continued)

(52) U.S. Cl.
CPC ............. *F01D 9/042* (2013.01); *F01D 5/141* (2013.01); *F01D 9/041* (2013.01); *F01D 11/008* (2013.01);

(Continued)

(58) Field of Classification Search
CPC ........ F01D 9/041; F01D 9/042; F01D 25/246; F01D 9/04; F01D 5/141; F01D 11/008;
(Continued)

(56) References Cited

U.S. PATENT DOCUMENTS

| 3,617,147 A | 11/1971 | Lawrence |
| 4,832,568 A * | 5/1989 | Roth ....................... F01D 9/042 |
| | | 415/189 |

(Continued)

FOREIGN PATENT DOCUMENTS

| CN | 1330208 A | 1/2002 |
| CN | 1467363 A | 1/2004 |

(Continued)

OTHER PUBLICATIONS

International Search Report dated Jan. 12, 2016 in PCT/JP2015/078098.

*Primary Examiner* — Jason D Shanske
*Assistant Examiner* — Eric J Zamora Alvarez
(74) *Attorney, Agent, or Firm* — Oblon, McClelland, Maier & Neustadt, L.L.P.

(57) ABSTRACT

When a combination of a vane type of a stator vane and a vane type of a stator vane for one straightening plate is the same as a combination of a vane type of a stator vane and a vane type of a stator vane for the other straightening plate, positions of the first straightening plate side connection portions and the second straightening plate side connection portions of the one straightening plate and the other straightening plate are the same as each other. When the combinations are different from each other, at least one of the positions of the first straightening plate side connection portions of the one straightening plate and the other straightening plate and the positions of the second straightening plate side connection portions of the one straightening plate and the other straightening plate are different from each other.

6 Claims, 10 Drawing Sheets

(51) Int. Cl.
  *F04D 29/08* (2006.01)
  *F01D 11/00* (2006.01)
  *F01D 25/24* (2006.01)
  *F02K 3/06* (2006.01)

(52) U.S. Cl.
  CPC .............. *F01D 25/246* (2013.01); *F02K 3/06* (2013.01); *F04D 29/083* (2013.01); *F04D 29/542* (2013.01); *F04D 29/646* (2013.01); *F05D 2230/51* (2013.01); *F05D 2230/60* (2013.01); *F05D 2240/80* (2013.01); *F05D 2260/30* (2013.01); *F05D 2260/84* (2013.01); *Y02T 50/672* (2013.01); *Y02T 50/673* (2013.01)

(58) Field of Classification Search
  CPC .... F04D 29/542; F04D 29/544; F04D 29/083; F04D 29/646; F05D 2240/12; F05D 2240/129; F05D 2230/51; F05D 2230/60; F05D 2240/80; F05D 2260/30; F05D 2260/84; Y02T 50/672; Y02T 50/673
  See application file for complete search history.

(56) References Cited

U.S. PATENT DOCUMENTS

| | | |
|---|---|---|
| 5,222,360 A | 6/1993 | Antuna et al. |
| 5,307,623 A | 5/1994 | Antuna et al. |
| 5,320,490 A | 6/1994 | Corbin et al. |
| 6,371,725 B1 | 4/2002 | Manteiga et al. |
| 2004/0009059 A1 | 1/2004 | Soechting et al. |
| 2007/0224038 A1 | 9/2007 | Solomon et al. |
| 2009/0169371 A1 | 7/2009 | Tsuchiya et al. |
| 2009/0317246 A1 | 12/2009 | Lutz et al. |
| 2010/0047065 A1 | 2/2010 | Sakamoto et al. |
| 2010/0080692 A1 | 4/2010 | Tudor et al. |
| 2010/0111685 A1 | 5/2010 | Sjunnesson et al. |
| 2012/0171028 A1 | 7/2012 | Tudor et al. |
| 2013/0280054 A1* | 10/2013 | Holmes .................. F01D 9/042 415/191 |

FOREIGN PATENT DOCUMENTS

| | | |
|---|---|---|
| EP | 2 706 240 A2 | 3/2014 |
| FR | 2 685 383 A1 | 6/1993 |
| JP | 48-25689 | 7/1973 |
| JP | 5-185994 | 7/1993 |
| JP | 2002-61600 | 2/2002 |
| JP | 2008-169783 | 7/2008 |
| JP | 2009-248417 | 10/2009 |
| JP | 2010-102927 | 5/2010 |
| JP | 2012-180906 | 9/2012 |
| RU | 2 474 699 C2 | 2/2013 |
| WO | WO 2007/063768 A1 | 6/2007 |

* cited by examiner

*Fig.7*
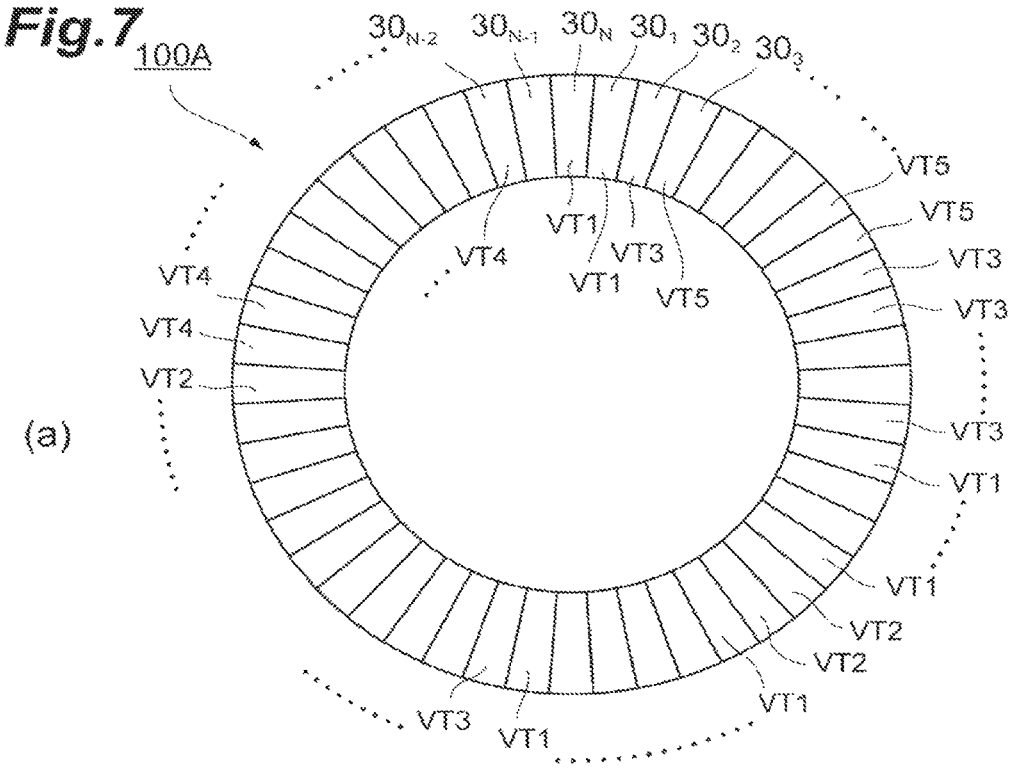
(a)
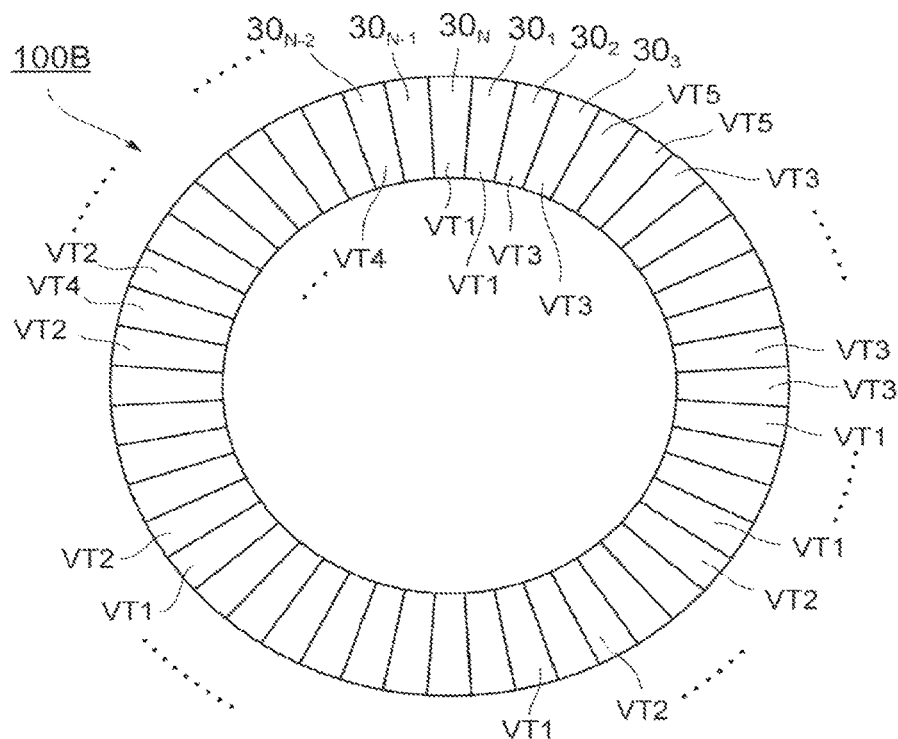
(b)

*Fig.8*
(a)
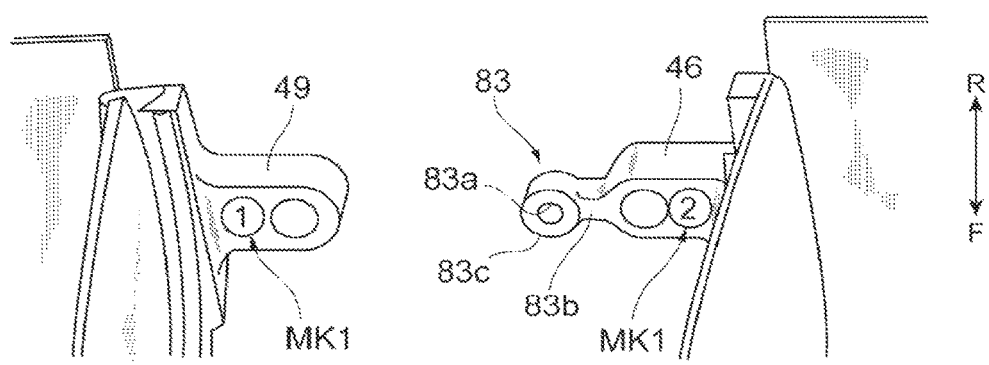
(b)
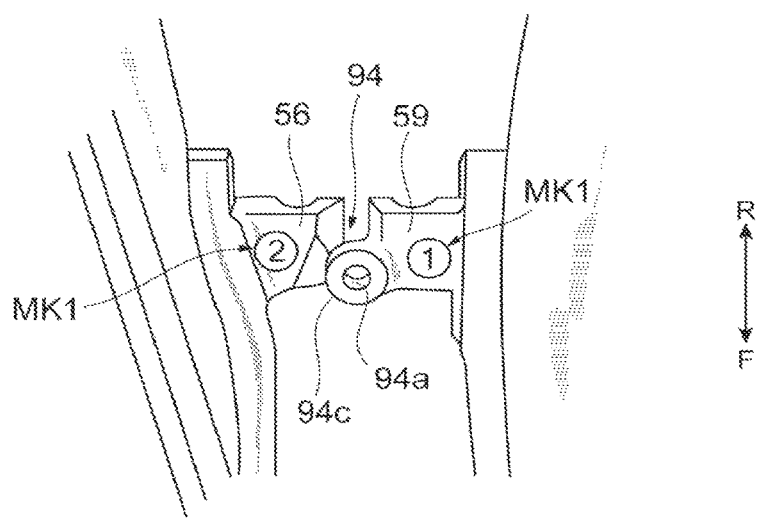

Fig.10
(a)
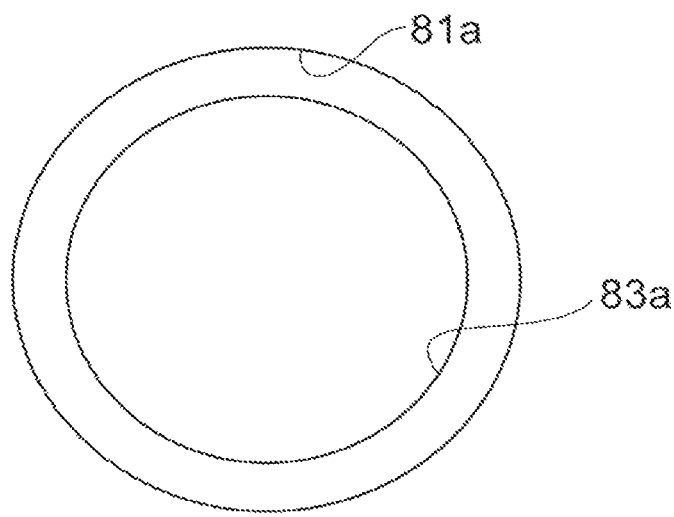
(b)
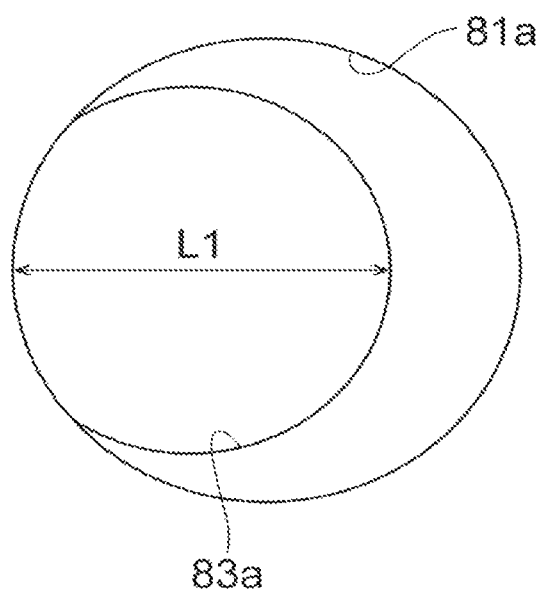

STATOR-VANE STRUCTURE AND TURBOFAN ENGINE

TECHNICAL FIELD

The disclosure relates to a stator-vane structure and a turbo fan engine. Priority is claimed on Japanese Patent Application No. 2014-207323, filed Oct. 8, 2014, the content of which is incorporated herein by reference.

BACKGROUND ART

Recently, there is known a stator-vane structure applied to a turbo fan engine. For example, Patent Literature 1 discloses a stator-vane structure including a plurality of stator vanes fixed to a case of a turbo fan engine and disposed to be separated from each other. The stator-vane structure is used to straighten a flow of a gas bypassing a core engine.

CITATION LIST

Patent Literature

Patent Literature 1: Japanese Unexamined Patent Publication No. H5-185994

SUMMARY OF INVENTION

Technical Problem

Here, there is a case in which a straightening plate is disposed between the adjacent stator vanes. Further, there is a case where a plurality of stator vanes include two or more types of blades each having a different vane type. In such a case, there is a need to prepare a plurality of types of the straightening plates each having a different shape in response to the vane types of the stator vanes to be assembled thereto. Likewise, there is a possibility that a straightening plate having a wrong shape may be assembled between the pair of stator vanes when the plurality of types of the straightening plates each having a different shape are assembled.

Here, the disclosure relates to a stator-vane structure and a turbo fan engine capable of preventing an erroneous assembly of a straightening plate.

Solution to Problem

According to an aspect of the disclosure, there is provided a stator-vane structure including: a plurality of stator vanes which are fixed to a case of a turbo fan engine at an end portion in a longitudinal direction and are disposed at an interval; and a plurality of straightening plates which are disposed among the plurality of stator vanes to face the case at the side of the end portion, wherein the plurality of stator vanes include two or more types of blades each having a different vane type, wherein each of the plurality of straightening plates includes a ventral face side edge portion which follows a ventral face of a first stator vane at one adjacent side, a dorsal face side edge portion which follows a dorsal face of a second stator vane at the other side, a first straightening plate side connection portion which is connected to the first stator vane, and a second straightening plate side connection portion which is connected to the second stator vane, wherein each of the plurality of stator vanes includes a first stator vane side connection portion which is provided at a position corresponding to the first straightening plate side connection portion at the side of the ventral face and is connected to the first straightening plate side connection portion and a second stator vane side connection portion which is provided at a position corresponding to the second straightening plate side connection portion at the side of the rear face and is connected to the second straightening plate side connection portion, wherein when a combination of a vane type of the first stator vane and a vane type of the second stator vane for one straightening plate is the same as a combination of a vane type of the first stator vane and a vane type of the second stator vane for the other straightening plate, positions of the first straightening plate side connection portions of the one straightening plate and the other straightening plate are the same as each other and positions of the second straightening plate side connection portions of the one straightening plate and the other straightening plate are the same as each other, and wherein when the combination of the vane type of the first stator vane and the vane type of the second stator vane for the one straightening plate is different from the combination of the vane type of the first stator vane and the vane type of the second stator vane for the other straightening plate, at least one of the positions of the first straightening plate side connection portions of the one straightening plate and the other straightening plate and the positions of the second straightening plate side connection portions of the one straightening plate and the other straightening plate are different from each other.

Advantageous Effects of Invention

According to the disclosure, an erroneous assembly of a straightening plate can be prevented.

BRIEF DESCRIPTION OF DRAWINGS

FIGS. 7(a) and 7(b) are schematic diagrams showing an example of an arrangement of the stator vane when viewed from a rear side of the turbo fan engine.

FIG. 8(a) is an enlarged view of a configuration in the vicinity of a first stator vane side connection portion and FIG. 8(b) is an enlarged view of a configuration in the vicinity of a second stator vane side connection portion.

FIG. 10 is a schematic diagram showing a deviation between a through-hole and a bolt.

DESCRIPTION OF EMBODIMENTS

Figure 1:
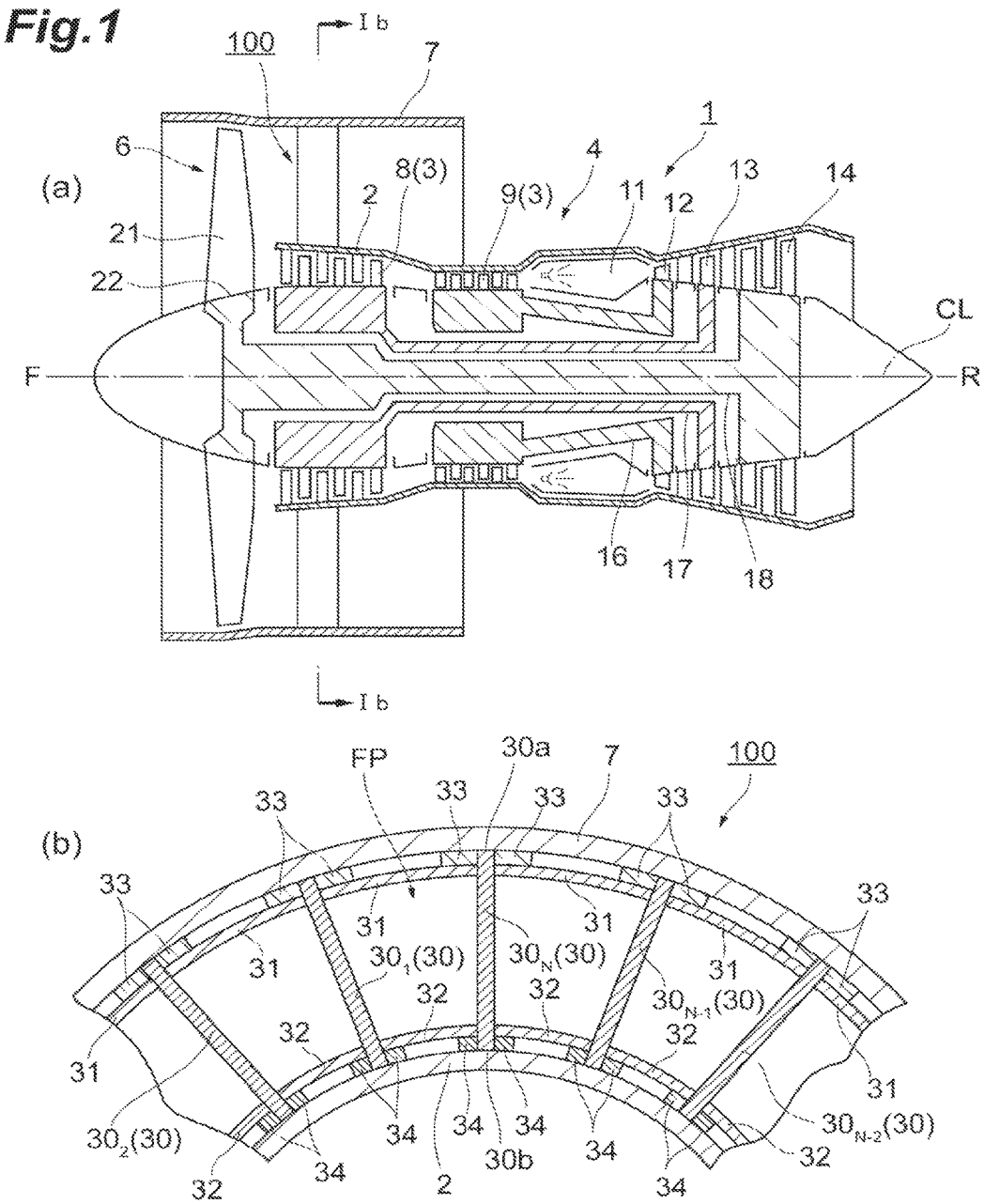
FIG. 1(a) is a schematic cross-sectional view of a turbo fan engine including a stator-vane structure according to an embodiment of the disclosure and FIG. 1(b) is a schematic cross-sectional view taken along a line Ib-Ib of FIG. 1(a) when viewed from a front side of the turbo fan engine.

In a stator-vane structure according to an aspect of the disclosure, when a combination of a vane type of a first stator vane and a vane type of a second stator vane for one straightening plate is the same as a combination of a vane type of a first stator vane and a vane type of a second stator vane for the other straightening plate, positions of first straightening plate side connection portions of the one straightening plate and the other straightening plate are the same as each other and positions of second straightening plate side connection portions of the one straightening plate and the other straightening plate are the same as each other. That is, when a shape of the one straightening plate is the same as a shape of the other straightening plate, positions of the first straightening plate side connection portions and the second straightening plate side connection portions are the same as each other. A first stator vane side connection portion of the first stator vane and a second stator vane side connection portion of the second stator vane for the one straightening plate are provided at positions respectively corresponding to the first straightening plate side connection portion and the second straightening plate side connection portion of the one straightening plate. Thus, since the first stator vane side connection portion of the first stator vane and the second stator vane side connection portion of the second stator vane for the one straightening plate also correspond to the positions of the first straightening plate side connection portion and the second straightening plate side connection portion of the other straightening plate, these connection portions can be connected to each other. Accordingly, when a shape of any one of the straightening plates of the stator-vane structure corresponds to a combination of the vane type of the first stator vane and the vane type of the second stator vane, each straightening plate side connection portion can be connected to each stator vane side connection portion. Each of the plurality of straightening plates can be assembled between the pair of stator vanes at any position in the stator-vane structure as long as the shape corresponds to the combination. Meanwhile, when a combination of the vane type of the first stator vane and the vane type of the second stator vane for the one straightening plate is different from a combination of the vane type of the first stator vane and the vane type of the second stator vane for the other straightening plate, at least one of the positions of the first straightening plate side connection portions of the one straightening plate and the other straightening plate and the positions of the second straightening plate side connection portions of the one straightening plate and the other straightening plate are different from each other. That is, when the shapes of the one straightening plate and the other straightening plate are different from each other, at least one of the positions of the first straightening plate side connection portions and the positions of the second straightening plate side connection portions are different from each other. The first stator vane side connection portion of the first stator vane and the second stator vane side connection portion of the second stator vane for the one straightening plate are provided at positions respectively corresponding to the first straightening plate side connection portion and the second straightening plate side connection portion of the one straightening plate. Thus, since the first stator vane side connection portion of the first stator vane and the second stator vane side connection portion of the second stator vane for the one straightening plate do not correspond to the positions of the first straightening plate side connection portion and the second straightening plate side connection portion of the other straightening plate, these connection portions cannot be connected to each other. Accordingly, when a shape of any one of the straightening plates of the stator-vane structure 100 does not correspond to a combination of the vane type of the first stator vane and the vane type of the second stator vane, each straightening plate side connection portion and each stator vane side connection portion cannot be connected to each other. Thus, each of the plurality of straightening plates cannot be assembled between the pair of stator vanes involving with a combination of non-corresponding shapes. With the above-described configuration, an erroneous assembly of the straightening plate can be prevented.

In the stator-vane structure according to an aspect of the disclosure, when the shape of the ventral face side edge portion of the one straightening plate is the same as the shape of the ventral face side edge portion of the other straightening plate, the positions of the first straightening plate side connection portions of the one straightening plate and the other straightening plate may be the same as each other regardless of the shape of the dorsal face side edge portion of the one straightening plate and the shape of the dorsal face side edge portion of the other straightening plate. Meanwhile, when the shape of the dorsal face side edge portion of the one straightening plate is the same as the shape of the dorsal face side edge portion of the other straightening plate, the positions of the second straightening plate side connection portions of the one straightening plate and the other straightening plate may be the same as each other regardless of the shape of the ventral face side edge portion of the one straightening plate and the shape of the ventral face side edge portion of the other straightening plate. Accordingly, when any one of the shape of the ventral face side edge portion and the shape of the dorsal face side edge portion is common between the one straightening plate and the other straightening plate, the position of the corresponding straightening plate side connection portion can be also commonly set. In this way, since the structures of the straightening plates being partially common enables the components to be easily designed, and manufactured, and the like.

In the stator-vane structure according to an aspect of the disclosure, the first straightening plate side connection portion is provided at any one of the front side and the rear side of the turbo fan engine, and the second straightening plate side connection portion is provided at any one of the front side and the rear side. When the first stator vane for the one straightening plate is of one vane type and the first stator vane for the other straightening plate is of another vane type, the first straightening plate side connection portion of the other straightening plate may be provided at the front side of the first straightening plate side connection portion of the one straightening plate. Then, when the second stator vane for the one straightening plate is of one vane type and the second stator vane for the other straightening plate is of another vane type, the second straightening plate side connection portion of the other straightening plate may be provided at the rear side of the second straightening plate side connection portion of the one straightening plate. In this way, a deviation direction of the first straightening plate side connection portion in response to the vane type of the first stator vane and a deviation direction of the second straightening plate side connection portion in response to the vane type of the second stator vane are opposite to each other in the front to rear direction. With such a configuration, it is possible to reduce a pattern in which a linear distance between the first straightening plate side connection portion and the second straightening plate side connection portion of the one straightening plate matches a linear distance between the first straightening plate side connection portion and the second straightening plate side connection portion of the other straightening plate when the shape of the one straightening plate is different from the shape of the other straightening plate. Accordingly, an erroneous assembly of the straightening plate can be more prevented.

In the stator-vane structure according to an aspect of the disclosure, each of the first stator vane side connection portion and the second stator vane side connection portion may be provided with a bolt hole and each of the first straightening plate side connection portion and the second straightening plate side connection portion may be provided with a through-hole. With such a structure, when the through-holes of the first straightening plate side connection portion and the second straightening plate side connection portion communicate with the bolt holes of the first stator vane side connection portion and the second stator vane side connection portion and bolts are fastened to the bolt holes through the through-holes, the straightening plate can be assembled to the stator vane. Further, since the bolt cannot be fastened only by the deviation between the position of the bolt hole and the position of the through-hole, each straightening plate side connection portion and each stator vane side connection portion cannot be connected to each other. In this way, an erroneous assembly of the straightening plate can be prevented by a simple configuration.

In the stator-vane structure according to an aspect of the disclosure, each of the plurality of stator vanes may be provided with a stator vane side identification portion used to visually recognize the vane type of the stator vane and each of the plurality of straightening plates may be provided with a straightening plate side identification portion used to visually recognize the vane type of the first stator vane and the vane type of the second stator vane. With such a structure, an operator can easily determine whether the straightening plate corresponding to an engagement target has a correct shape just by seeing the straightening plate side identification portion and the stator vane side identification portion.

The turbo fan engine according to an aspect of the disclosure may include a core engine which includes a compressor provided inside an inner case, a fan which is provided at a front part of the compressor, an outer case which accommodates the core engine and the fan, and a stator-vane structure which is provided between the outer case and the inner case behind a rotor vane of the fan and straightens a flow of a gas bypassing the core engine. Here, the above-described stator-vane structure may be provided as the stator-vane structure.

Since the turbo fan engine according to an aspect of the disclosure includes the stator-vane structure, an erroneous assembly of the straightening plate can be prevented.

An embodiment of the disclosure will be described with reference to the drawings, but the embodiment below is an example that describes the disclosure. It should be understood that the disclosure is not limited to the content described below. In the description, the same reference numerals will be given to the same components or the components having the same functions and a repetitive description thereof will be omitted.

FIG. 1(a) is a schematic cross-sectional view of a turbo fan engine 1 including a stator-vane structure 100 according to the embodiment. The turbo fan engine 1 includes a core engine 4 which includes a compressor 3 provided inside an inner case 2, a fan 6 which is provided at a front part of the compressor 3, an outer case 7 which accommodates the core engine 4 and the fan 6, and a stator-vane structure 100 which is provided between the outer case 7 and the inner case 2 at a rear side of the fan 6 and straightens a flow of a gas bypassing the core engine 4. Additionally, in the description below, a description will be made on the assumption that an upstream side in a direction in which a gas (air) flows to the turbo fan engine 1 is set as a "front" and a downstream side in that direction is set as a "rear". Further, the terms of a "circumferential direction" and a "radial direction" will be used by the reference of a center line CL of the turbo fan engine 1. Additionally, in the drawings, a front side is indicated by an arrow F and a rear side is indicated by an arrow R in order to show a front to rear direction if necessary.

The core engine 4 is configured as a turbo jet engine in which a low-pressure compressor 8, a high-pressure compressor 9, a combustion chamber 11, a high-pressure turbine 12, a low-pressure turbine 13, and a fan turbine 14 are disposed inside the inner case 2 in a direction from the front side toward the rear side. The inner case 2 is formed in a substantially cylindrical shape about the center line CL of the turbo fan engine 1. The high-pressure turbine 12 is connected to the high-pressure compressor 9 through a high-pressure shaft 16. The low-pressure turbine 13 is connected to the low-pressure compressor 8 through a low-pressure shaft 17. The fan turbine 14 is connected to the fan 6 through a fan shaft 18. Additionally, any one of a combination of the high-pressure turbine 12 and the high-pressure compressor 9 and a combination of the low-pressure turbine 13 and the low-pressure compressor 8 may be omitted.

The fan 6 includes a plurality of rotor vanes 21 which are disposed at an interval in the circumferential direction. The outer case 7 which has a substantially cylindrical shape is formed in the periphery of the fan 6 to surround the fan 6 about the center line CL. The fan 6 which is accommodated inside the outer case 7 includes a fan disk 22 which is attached to the fan shaft 18 and a plurality of rotor vanes 21 which are disposed in the fan disk 22 at an interval in the circumferential direction and extend in the radial direction. The rotor vane 21 is formed in a shape which is devised by a study in consideration of aerodynamic characteristics.

FIG. 1(b) is a schematic cross-sectional view taken along a line Ib-Ib shown in FIG. 1(a) when viewed from a front side of the turbo fan engine. As shown in FIG. 1(b), the stator-vane structure 100 includes a plurality of stator vanes 30 which are disposed at an interval, a plurality of outer straightening plates 31 which are disposed among the plurality of stator vanes 30, and a plurality of inner straightening plates 32 which are disposed among the plurality of stator vanes 30. The plurality of stator vanes 30 are disposed at an interval in the circumferential direction between the inner case 2 and the outer case 7. Each of the plurality of stator vanes 30 is disposed between the inner case 2 and the outer case 7 to extend in the radial direction. Each of the plurality of stator vanes 30 includes an outer fixed portion 33 at an outer circumferential side end portion 30a in the longitudinal direction and includes an inner fixed portion 34 at an inner circumferential side end portion 30b in the longitudinal direction. The outer fixed portion 33 is used to fix the stator vane 30 to the outer case (casing) 7 of the turbo fan engine 1. The inner fixed portion 34 is used to fix the stator vane 30 to the case (casing) 2 of the turbo fan engine 1. Each of the plurality of stator vanes 30 is fixed to the outer case 7 through the outer fixed portion 33 at the outer circumferential side end portion 30a. Each of the plurality of stator vanes 30 is fixed to the inner case 2 through the inner fixed portion 34 at the inner circumferential side end portion 30b. Each of the plurality of outer straightening plates 31 is disposed between the adjacent stator vanes 30 in the circumferential direction in order to cover the outer fixed portion 33 at the inner circumferential side in the vicinity of the end portion 30a. Each of the plurality of outer straightening plates 31 is widened at a position separated from the inner circumferential face of the outer case 7 while the inner circumferential side faces the outer straightening plate 31 and accommodates the outer fixed portion 33 in a space formed between the outer straightening plate 31 and the outer case 7. Each of the plurality of inner straightening plates 32 is disposed between the adjacent stator vanes 30 in the circumferential direction in order to cover the inner fixed portion 34 at the outer circumferential side in the vicinity of the inner circumferential side end portion 30b. Each of the plurality of inner straightening plates 32 is widened at a position separated from the outer circumferential face of the inner case 2 while the outer circumferential side faces the inner straightening plate 32 and accommodates the inner fixed portion 34 in a space formed between inner straightening plate 32 and the inner case 2. With the above-described configuration, a region surrounded by the stator vane 30, the outer straightening plate 31, and the inner straightening plate 32, that are adjacent to one another in the circumferential direction, serves as a flow passage FP along which a gas passes. In a manufacturing process, the plurality of stator vanes 30 are fixed throughout an entire circumference between the outer case 7 and the inner case 2. Next, the plurality of straightening plates 31 and 32 are attached.

Additionally, in the embodiment, a description will be made on the assumption that the stator-vane structure 100 includes N number of stator vanes 30, N number of outer straightening plates 31, and N number of inner straightening plates 32 (N is a natural number of 2 or more). Further, for convenience of description, a description will be made on the assumption that a n−1-th (n=2 to a natural number of N) stator vane is a "stator vane $30_{n-1}$" and a n-th stator vane which is adjacent to the stator vane $30_{n-1}$ in the circumferential direction is a "stator vane $30_n$". Further, a description will be made on the assumption that an outer straightening plate and an inner straightening plate which are disposed between the stator vane $30_{n-1}$ and the stator vane $30_n$ are an "outer straightening plate $31_n$" and an "inner straightening plate $32_n$". Here, the outer straightening plate $31_1$ and the inner straightening plate $32_1$ are disposed between the stator vane 30N and the stator vane $30_1$.

Figure 2:
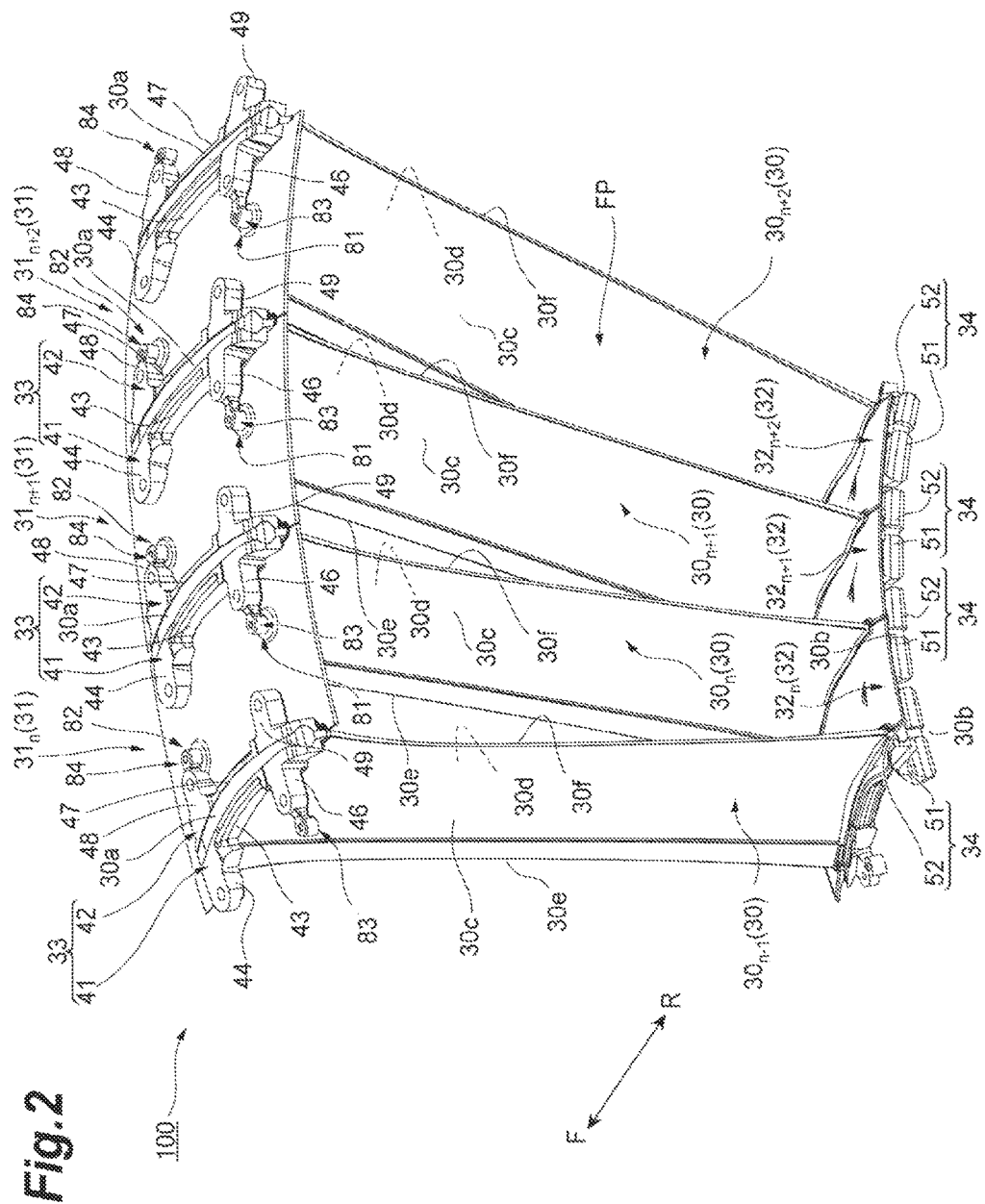
FIG. 2 is a perspective view showing a part of the stator-vane structure.
Figure 3:
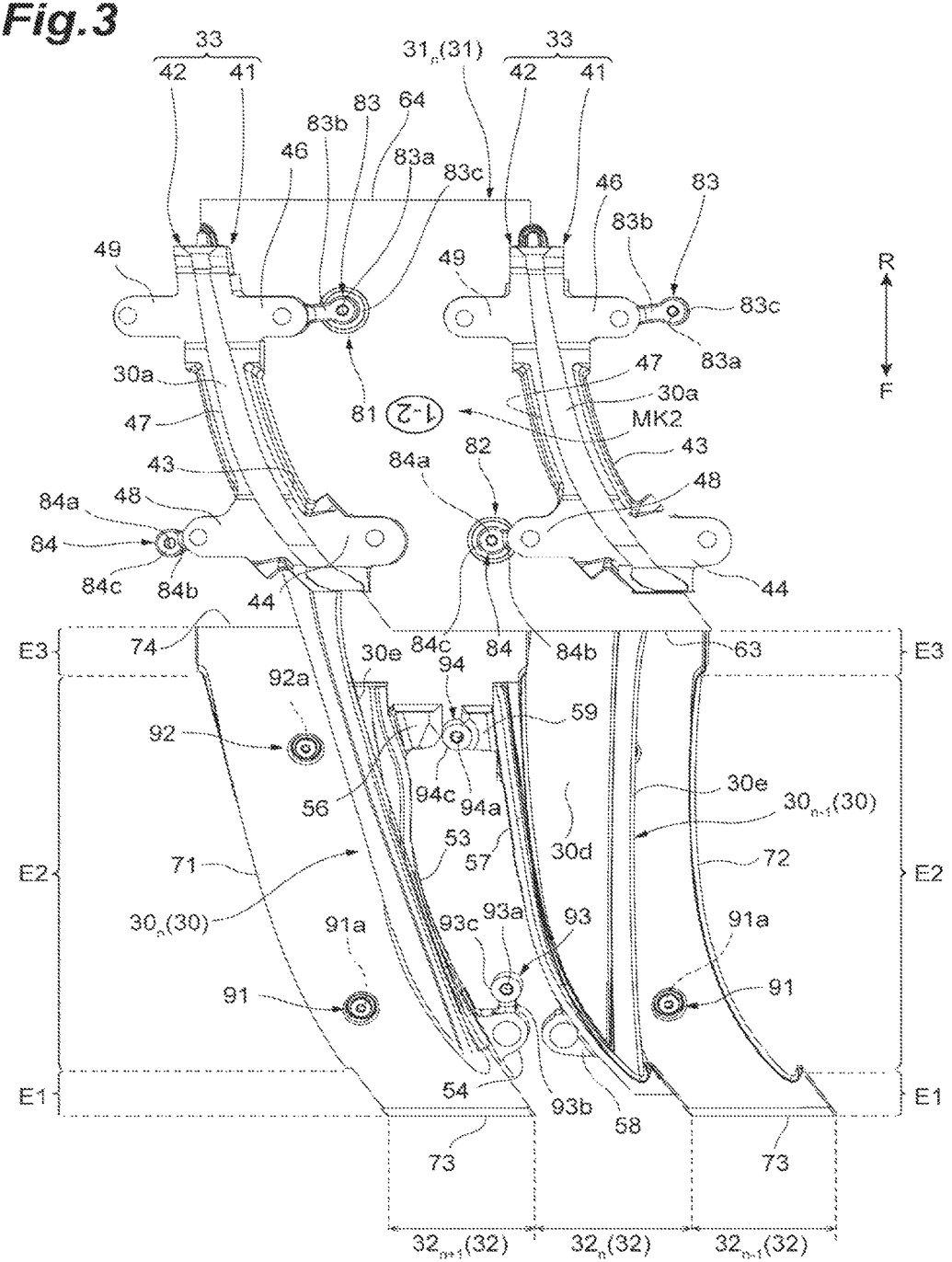
FIG. 3 is a view showing an outer straightening plate of the stator-vane structure when viewed from an outer circumferential side.
Figure 4:
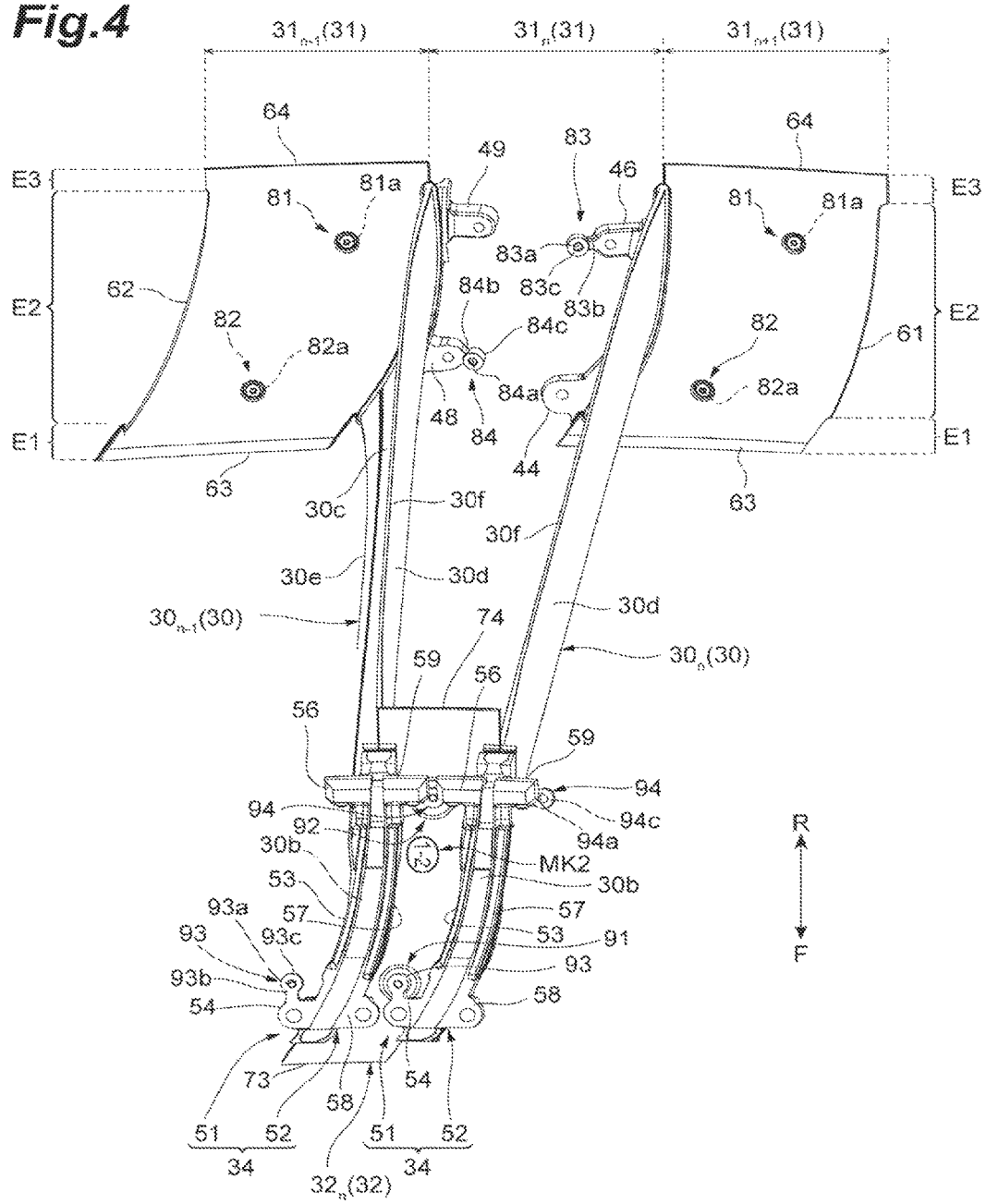
FIG. 4 is a view showing an inner straightening plate of the stator-vane structure when viewed from an inner circumferential side.

Next, a detailed configuration of the stator-vane structure 100 will be described with reference to FIGS. 2, 3, and 4. FIG. 2 is a perspective showing a part of the stator-vane structure 100. FIG. 3 is a view showing the outer straightening plate 31 of the stator-vane structure 100 when viewed from the outer circumferential side. FIG. 4 is a view showing the inner straightening plate 32 of the stator-vane structure 100 when viewed from the inner circumferential side. Here, in FIGS. 3 and 4, a part of the outer straightening plate 31 and the inner straightening plate 32 are omitted in order to help the comprehension. Each of the plurality of stator vanes 30 is formed in a shape which is twisted in consideration of aerodynamic characteristics and has a cross-sectional shape which is curved toward one side in the circumferential direction. Additionally, in the description below, the stator vane $30_n$ of the plurality of stator vanes 30 will be described, the outer straightening plate $31_n$ of the plurality of outer straightening plates 31 will be described, and the inner straightening plate $32_n$ of the plurality of inner straightening plates 32 will be described. Here, since the other stator vanes 30, the other outer straightening plates 31, and the other inner straightening plate 32 also have the same configuration, a description thereof will be omitted.

Specifically, the stator vane $30_n$ includes a ventral face 30c, a dorsal face 30d, a leading edge 30e which connects the ventral face 30c and the dorsal face 30d to each other at an upstream side, and a trailing edge 30f which connects the ventral face 30c and the dorsal face 30d to each other at a downstream side. The ventral face 30c is a curved face which is curved to be recessed inward in the blade thickness direction. The dorsal face 30d is a curved face which is curved to be swollen outward in the blade thickness direction. The stator vane $30_n$ may be formed of a composite material of thermosetting resin such as epoxy resin, phenol resin, and polyimide resin or thermoplastic resin such as polyetherimide, polyetheretherketone, and polyphenylene-sulfide, and enforced fiber such as carbon fiber, aramid fiber, and glass fiber, and then, for example laminating in the blade thickness direction or three-dimensionally interwoven. Accordingly, the plurality of stator vanes 30 may be used to straighten a gas and to support the outer case 7. Additionally, the turbo fan engine 1 may separately include a structure member that supports the outer case 7 in addition to the plurality of stator vanes 30.

The outer fixed portion 33 includes fixed brackets 41 and 42 which are provided at a part near the outer circumferential side end portion 30a of the stator vane $30_n$. The fixed brackets 41 and 42 may be formed of metal such as aluminum alloy or titanium alloy. The fixed bracket 41 is fixed to the ventral face 30c of the stator vane $30_n$ and the fixed bracket 42 is fixed to the dorsal face 30d of the stator vane $30_n$. The end faces of the fixed bracket 41 and the fixed bracket 42 at the outer circumferential side are disposed to match the outer circumferential side end portion 30a of the stator vane $30_n$. The fixed bracket 41 includes an elongated portion 43 which extends from the leading edge 30e to the trailing edge 30f along the ventral face 30c of the stator vane $30_n$, a protrusion portion 44 which protrudes from the elongated portion 43 at the leading edge 30e in the circumferential direction, and a protrusion portion 46 which protrudes from the elongated portion 43 at the trailing edge 30f in the circumferential direction. The fixed bracket 42 includes an elongated portion 47 which extends from the leading edge 30e to the trailing edge 30f along the dorsal face 30d of the stator vane $30_n$, a protrusion portion 48 which protrudes from the elongated portion 47 at the leading edge 30e in the circumferential direction, and a protrusion portion 49 which protrudes from the elongated portion 47 at the trailing edge 30f in the circumferential direction. The protrusion portion 44 of the fixed bracket 41 and the protrusion portion 48 of the fixed bracket 42 protrude in the opposite directions at the same position in the front to rear direction. Front end portions of the protrusion portions 44 and 48 are formed in a semi-circular shape and a bolt hole is formed at a center position of the semi-circular shape in the radial direction. The protrusion portion 46 of the fixed bracket 41 and the protrusion portion 49 of the fixed bracket 42 protrude in the opposite directions at the same position in the front to rear direction. Front end portions of the protrusion portions 46 and 49 are formed in a semi-circular shape and a bolt hole is formed at a center position of the semi-circular shape in the radial direction. The elongated portions 43 and 47 of the fixed brackets 41 and 42 are fixed to the stator vane $30_n$ by a bolt. Further, the protrusion portions 44, 46, 48, and 49 of the fixed brackets 41 and 42 are fixed to the outer case 7 by bolts. Accordingly, the stator vane $30_n$ is fixed to the outer case 7 through the fixed brackets 41 and 42 of the outer fixed portion 33. Additionally, the outer fixed portion 33 includes the fixed brackets 41 and 42 which are separated from the stator vane $30_n$, but may be integrally formed with the stator vane $30_n$ by the same material. The outer fixed portion 33 is provided with stator vane side connection portions 83 and 84, but a detailed description thereof will be made below.

The inner fixed portion 34 includes fixed brackets 51 and 52 which are provided at a part near the inner circumferential side end portion 30b of the stator vane $30_n$. The fixed brackets 51 and 52 may be formed of metal such as aluminum alloy or titanium alloy. The fixed bracket 51 is fixed to the ventral face 30c of the stator vane $30_n$ and the fixed bracket 52 is fixed to the dorsal face 30d of the stator vane $30_n$. The end faces of the fixed bracket 51 and the fixed bracket 52 at the inner circumferential side are disposed to match the inner circumferential side end portion 30b of the stator vane $30_n$. The fixed bracket 51 includes an elongated portion 53 which extends from the leading edge 30e to the trailing edge 30f along the ventral face 30c of the stator vane $30_n$, a protrusion portion 54 which protrudes from the elongated portion 53 at the leading edge 30e in the circumferential direction, and a protrusion portion 56 which protrudes from the elongated portion 53 at the trailing edge 30f in the circumferential direction. The fixed bracket 52 includes an elongated portion 57 which extends from the leading edge 30e to the trailing edge 30f along the dorsal face 30d of the stator vane $30_n$, a protrusion portion 58 which protrudes from the elongated portion 57 at the leading edge 30e in the circumferential direction, and a protrusion portion 59 which protrudes from the elongated portion 57 at the trailing edge 30f in the circumferential direction. The protrusion portion 54 of the fixed bracket 51 and the protrusion portion 58 of the fixed bracket 52 protrude in the opposite directions at the same position in the front to rear direction. Front end portions of the protrusion portions 54 and 58 are formed in a semi-circular shape and a bolt hole is formed at a center position of the semi-circular shape in the radial direction. The protrusion portion 56 of the fixed bracket 51 and the protrusion portion 59 of the fixed bracket 52 protrude in the opposite directions at the same position in the front to rear direction. Front end portions of the protrusion portions 56 and 59 are formed in a rectangular shape and a bolt hole is formed in the front to rear direction. The elongated portions 53 and 57 of the fixed brackets 51 and 52 are fixed to the stator vane $30_n$ by a bolt. Further, the protrusion portions 54, 56, 58, and 59 of the fixed brackets 51 and 52 are fixed to the inner case 2 by bolts. Accordingly, the stator vane $30_n$ is fixed to the inner case 2 through the fixed brackets 51 and 52 of the inner fixed portion 34. Additionally, the inner fixed portion 34 includes the fixed brackets 51 and 52 which are separated from the stator vane $30_n$, but may be integrally formed with the stator vane $30_n$ by the same material. The inner fixed portion 34 is provided with stator vane side connection portions 93 and 94, but a detailed description thereof will be made below.

The outer straightening plate $31_n$ includes a ventral face side edge portion 61 which follows the ventral face 30c of the stator vane $30_n$ adjacent at one side in the circumferential direction, a dorsal face side edge portion 62 which follows the dorsal face 30d of the stator vane $30_{n1-1}$ adjacent at the other side in the circumferential direction, a front edge portion 63, and a rear edge portion 64. Further, the outer straightening plate $31_n$ includes a rear face which faces the inner circumferential face of the outer case 7 and a front face which is exposed to the flow passage FP for a gas. The outer straightening plate $31_n$ is disposed to contact the inner circumferential side end faces of the fixed brackets 41 and 42 at the rear face. The rear face may be provided with a plurality of ribs (not shown) for ensuring the strength of the outer straightening plate $31_n$. The front face is formed as a smooth face so that a gas easily passes through the flow passage FP. The front edge portion 63 is disposed at a front side of the leading edge 30e of each of the stator vane $30_n$ and the stator vane $30_{n-1}$. The rear edge portion 64 is disposed at a rear side of the trailing edge 30f of each of the stator vane $30_n$ and the stator vane $30_{n-1}$. The front edge portion 63 and the rear edge portion 64 extend straightly to be orthogonal to the center line CL when viewed from the radial direction. Further, the outer straightening plate $31_n$ includes a first region E1 which is disposed at a part of a front side of the leading edge 30e of each of the stator vane $30_n$ and the stator vane $30_{n-1}$, a second region E2 which is disposed at a part interposed between the stator vane $30_n$ and the stator vane $30_{n-1}$, and a third region E3 which is disposed at a part of a rear side of the trailing edge 30f of each of the stator vane $30_n$ and the stator vane $30_{n-1}$ in order from the front side (see FIG. 4).

The ventral face side edge portion 61 is formed in a shape which substantially matches an outer shape of the ventral face 30c of the stator vane $30_n$ at the attachment position of the outer straightening plate $31_n$ in the second region E2. That is, the ventral face side edge portion 61 is curved to be swollen outward in the plane direction along the shape of the ventral face 30c in the second region E2. The dorsal face side edge portion 62 is formed in a shape which substantially matches an outer shape of the dorsal face 30d of the stator vane $30_{n-1}$ at the attachment position of the outer straightening plate $31_n$ in the second region E2. That is, the dorsal face side edge portion 62 is curved to be recessed inward in the plane direction along the shape of the dorsal face 30d in the second region E2. The shape of the ventral face side edge portion 61 at the first region E1 and the third region E3 of the outer straightening plate $31_n$ is not particularly limited, but may be formed in parallel to the dorsal face side edge portion 62 at the first region E1 and the third region E3 of the outer straightening plate $31_{n+1}$. The shape of the dorsal face side edge portion 62 at the first region E1 and the third region E3 of the outer straightening plate $31_n$ is not particularly limited, but may be formed in parallel to the ventral face side edge portion 61 at the first region E1 and the third region E3 of the outer straightening plate $31_{n-1}$. With the above-described configuration, a substantially entire area of an outer shape of a cross-sectional shape including the ventral face 30c, the dorsal face 30d, the leading edge 30e, and the trailing edge 30f of the stator vane $30_n$ is surrounded by the ventral face side edge portion 61 of the outer straightening plate $31_n$ and the dorsal face side edge portion 62 of the outer straightening plate $31_{n+1}$ in the outer circumferential side end portion 30a. Additionally, the ventral face side edge portion 61 and the dorsal face side edge portion 62 of the stator vane $30_n$ and the outer straightening plate $31_n$ may contact each other or may be separated from each other within a range of a manufacturing error.

The inner straightening plate $32_n$ includes a ventral face side edge portion 71 which follows the ventral face 30c of the stator vane $30_n$ adjacent at one side in the circumferential direction, a dorsal face side edge portion 72 which follows the dorsal face 30d of the stator vane $30_{n-1}$ adjacent at the other side in the circumferential direction, a front edge portion 73, and a rear edge portion 74. Further, the inner straightening plate $32_n$ includes a rear face which faces the inner circumferential face of the inner case 2 and a front face which is exposed to the flow passage FP for a gas. The inner straightening plate $32_n$ is disposed to contact the outer circumferential side end faces of the fixed brackets 51 and 52 at the rear face. The rear face may be provided with a plurality of ribs (not shown) for ensuring the strength of the inner straightening plate $32_n$. The front face is formed as a smooth face so that a gas easily passes through the flow passage FP. The front edge portion 73 is disposed at a front side of the leading edge 30e of each of the stator vane $30_n$ and the stator vane $30_{n-1}$. The rear edge portion 74 is disposed at a rear side of the trailing edge 30f of each of the stator vane $30_n$ and the stator vane $30_{n-1}$. The front edge portion 73 and the rear edge portion 74 extend straightly to be orthogonal to the center line CL when viewed from the radial direction. Further, the inner straightening plate $32_n$ includes a first region E1 which is disposed at a part of a front side of the leading edge 30e of each of the stator vane $30_n$ and the stator vane $30_{n-1}$, a second region E2 which is disposed at a part interposed between the stator vane $30_n$ and the stator vane $30_{n-1}$, and a third region E3 which is disposed at a part of a rear side of the trailing edge 30f of each of the stator vane $30_n$ and the stator vane $30_{n-1}$ in order from the front side.

The ventral face side edge portion 71 is formed in a shape which substantially matches an outer shape of the ventral face 30c of the stator vane $30_n$ at the attachment position of the inner straightening plate $32_n$ in the second region E2. That is, the ventral face side edge portion 71 is curved to be swollen outward in the plane direction along the shape of the ventral face 30c in the second region E2. The dorsal face side edge portion 72 is formed in a shape which substantially matches an outer shape of the dorsal face 30d of the stator vane $30_{n-1}$ at the attachment position of the inner straightening plate $32_n$ in the second region E2. That is, the dorsal face side edge portion 72 is curved to be recessed inward in the plane direction along the shape of the dorsal face 30d in the second region E2. The shape of the ventral face side edge portion 71 at the first region E1 and the third region E3 of the inner straightening plate $32_n$ is not particularly limited, but may be formed in parallel to the dorsal face side edge portion 72 at the first region E1 and the third region E3 of the inner straightening plate $32_{n+1}$. The shape of the dorsal face side edge portion 72 at the first region E1 and the third region E3 of the inner straightening plate $32_n$ is not particularly limited, but may be formed in parallel to the ventral face side edge portion 71 at the first region E1 and the third region E3 of the inner straightening plate $32_n-1$. With the above-described configuration, a substantially entire area of an outer shape of a cross-sectional shape including the ventral face 30c, the dorsal face 30d, the leading edge 30e, and the trailing edge 30f of the stator vane $30_n$ is surrounded by the ventral face side edge portion 71 of the inner straightening plate $32_n$ and the dorsal face side edge portion 72 of the inner straightening plate $32_{n+1}$ in the inner circumferential side end portion 30b. Additionally, the ventral face side edge portion 71 and the dorsal face side edge portion 72 of the stator vane $30_n$ and the inner straightening plate $32_n$ may contact each other or may be separated from each other within a range of a manufacturing error.

Here, a connection structure of the outer straightening plate $31_n$ and the inner straightening plate $32_n$ with respect to the stator vanes $30_n$ and $30_{n-1}$ will be described. The outer straightening plate $31_n$ includes a first straightening plate side connection portion 81 which is connected to the stator vane $30_n$ and a second straightening plate side connection portion 82 which is connected to the stator vane $30_{n-1}$. Further, the outer circumferential side end portion 30a of the stator vane $30_n$ is provided with a first stator vane side connection portion 83 which is connected to the first straightening plate side connection portion 81 of the outer straightening plate $31_n$ and a second stator vane side connection portion 84 which is connected to the second straightening plate side connection portion 82 of the outer straightening plate $31_{n+1}$. The first stator vane side connection portion 83 of the stator vane $30_n$ is provided at a position corresponding to the first straightening plate side connection portion 81 of the outer straightening plate $31_n$ at the ventral face 30c. The second stator vane side connection portion 84 of the stator vane $30_n$ is provided at a position corresponding to the second straightening plate side connection portion 82 of the outer straightening plate $31_{n+1}$ at the dorsal face 30d. Additionally, the second stator vane side connection portion 84 of the stator vane $30_{n-1}$ is provided at a position corresponding to the second straightening plate side connection portion 82 of the outer straightening plate $31_n$ and is connected to the second straightening plate side connection portion 82.

In the embodiment, the outer straightening plate $31_n$ and the stator vanes $30_{n-1}$ and $30_n$ are connected to each other by bolts. Thus, the first stator vane side connection portion 83 and the second stator vane side connection portion 84 are respectively provided with bolt holes 83a and 84a and the first straightening plate side connection portion 81 and the second straightening plate side connection portion 82 are respectively provided with through-holes 81a and 82a. Specifically, the straightening plate side connection portions 81 and 82 are formed in such a manner that the through-holes 81a and 82a are formed at positions which are set within the outer straightening plate $31_n$. The first stator vane side connection portion 83 includes an arm portion 83b which is provided at a front end of the protrusion portion 46 of the fixed bracket 41 and a fastening portion 83c which is provided at a front end of the arm portion 83b and is provided with the bolt hole 83a. The second stator vane side connection portion 84 includes an arm portion 84b which is provided at a front end of the protrusion portion 48 of the fixed bracket 42 and a fastening portion 84c which is provided at a front end of the arm portion 84b and is provided with a bolt hole 84a. In the embodiment, the first straightening plate side connection portion 81 is provided at a position near the rear edge portion 64, that is, a position on the side of the trailing edge 30f in relation to a center position in the front to rear direction of the second region E2. The second straightening plate side connection portion 82 is provided at a position near the front edge portion 63, that is, a position on the side of the leading edge 30e in relation to the center position in the front to rear direction of the second region E2. Further, the first stator vane side connection portion 83 is disposed at the substantially same position as that of the protrusion portion 46 of the fixed bracket 41 in the front to rear direction and is disposed on the side of the trailing edge 30f. The second stator vane side connection portion 84 is disposed at the substantially same position as that of the protrusion portion 48 of the fixed bracket 42 in the front to rear direction and is disposed on the side of the leading edge 30e. Additionally, the first straightening plate side connection portion 81 and the first stator vane side connection portion 83 may be disposed at a front side and the second straightening plate side connection portion 82 and the second stator vane side connection portion 84 may be disposed at a rear side. The first stator vane side connection portion 83 is disposed at a position where a bolt can be fastened to the bolt hole 83a through the through-hole 81a of the first straightening plate side connection portion 81 (see FIG. 9(a)). Further, the second stator vane side connection portion 84 is disposed at a position where a bolt can be fastened to the bolt hole 84a through the through-hole 82a of the second straightening plate side connection portion 82.

The inner straightening plate $32_n$ includes a first straightening plate side connection portion 91 which is connected to the stator vane $30_n$ and a second straightening plate side connection portion 92 which is connected to the stator vane $30_{n-1}$. Further, the inner circumferential side end portion 30b of the stator vane $30_n$ is provided with a first stator vane side connection portion 93 which is connected to the first straightening plate side connection portion 91 of the inner straightening plate $32_n$ and a second stator vane side connection portion 94 which is connected to the second straightening plate side connection portion 92 of the inner straightening plate $32_{n+1}$. The first stator vane side connection portion 93 of the stator vane $30_n$ is provided at a position corresponding to the first straightening plate side connection portion 91 of the inner straightening plate $32_n$ at the ventral face 30c. The second stator vane side connection portion 94 of the stator vane $30_n$ is provided at a position corresponding to the second straightening plate side connection portion 92 of the inner straightening plate $32_{n+1}$ at the dorsal face 30d. Additionally, the second stator vane side connection portion 94 of the stator vane $30_{n-1}$ is provided at a position corresponding to the second straightening plate side connection portion 92 of the inner straightening plate $32_n$ and is connected to the second straightening plate side connection portion 92.

In the embodiment, the inner straightening plate $32_n$ and the stator vanes $30_{n-1}$ and $30_n$ are connected to each other by bolts. Thus, a first stator vane side connection portion 93 and a second stator vane side connection portion 94 are respectively provided with bolt holes 93a and 94a. Further, a first straightening plate side connection portion 91 and a second straightening plate side connection portion 92 are respectively provided with through-holes 91a and 92a. Specifically, the straightening plate side connection portions 91 and 92 are formed in such a manner that the through-holes 91a and 92a are formed at position which are set within the inner straightening plate $32_n$. The first stator vane side connection portion 93 includes an arm portion 93b which is provided at a front end of the protrusion portion 54 of the fixed bracket 51 and a fastening portion 93c which is provided at a front end of the arm portion 93b and is provided with the bolt hole 93a. The second stator vane side connection portion 94 includes a fastening portion 94c which is provided at a front end of a protrusion portion 59 of the fixed bracket 52 and is provided with the bolt hole 94a. In the embodiment, the first straightening plate side connection portion 91 is provided at a position near the front edge portion 73, that is, a position on the side of the leading edge 30e in relation to the center position in the front to rear direction of the second region E2. The second straightening plate side connection portion 92 is provided at a position near the rear edge portion 74, that is, a position on the side of the trailing edge 30f in relation to the center position in the front to rear direction of the second region E2. Further, the first stator vane side connection portion 93 is disposed at the substantially same position as that of the protrusion portion 54 of the fixed bracket 51 in the front to rear direction and is disposed on the side of the leading edge 30e. The second stator vane side connection portion 94 is disposed at the substantially same position as that of the protrusion portion 59 of the fixed bracket 52 in the front to rear direction and is disposed on the side of the trailing edge 30f. Additionally, the first straightening plate side connection portion 91 and the first stator vane side connection portion 93 may be disposed at a rear side and the second straightening plate side connection portion 92 and the second stator vane side connection portion 94 may be disposed at a front side. The first stator vane side connection portion 93 is disposed at a position where a bolt can be fastened to the bolt hole 93a through the through-hole 91a of the first straightening plate side connection portion 91. Further, the second stator vane side connection portion 94 is disposed at a position where a bolt can be fastened to the bolt hole 94a through the through-hole 92a of the second straightening plate side connection portion 92.

Figure 5:
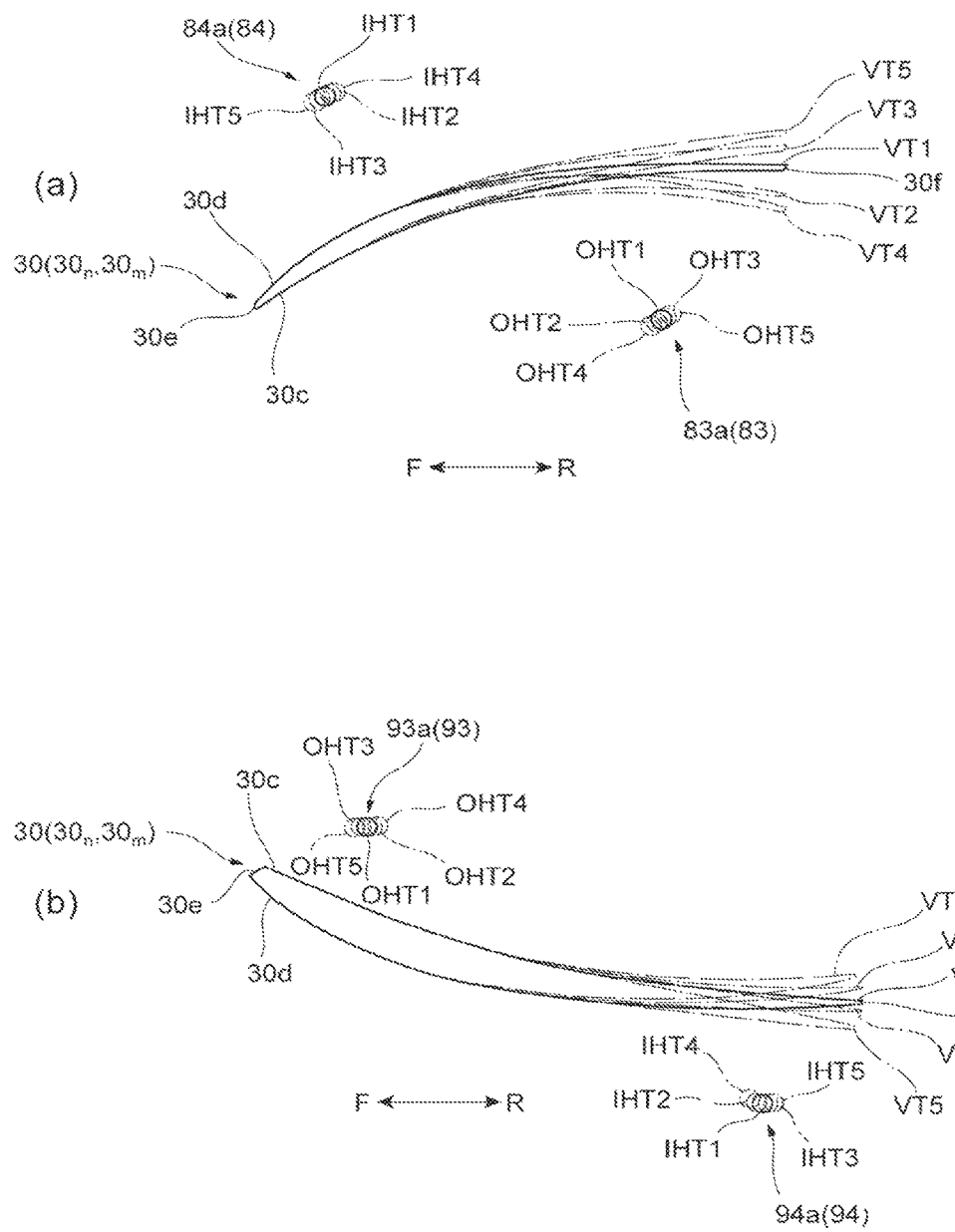
FIG. 5(a) shows a cross-sectional shape of a stator vane at an attachment position of the outer straightening plate and FIG. 5(b) shows a cross-sectional shape of a stator vane at an attachment position of the inner straightening plate.
Figure 6:
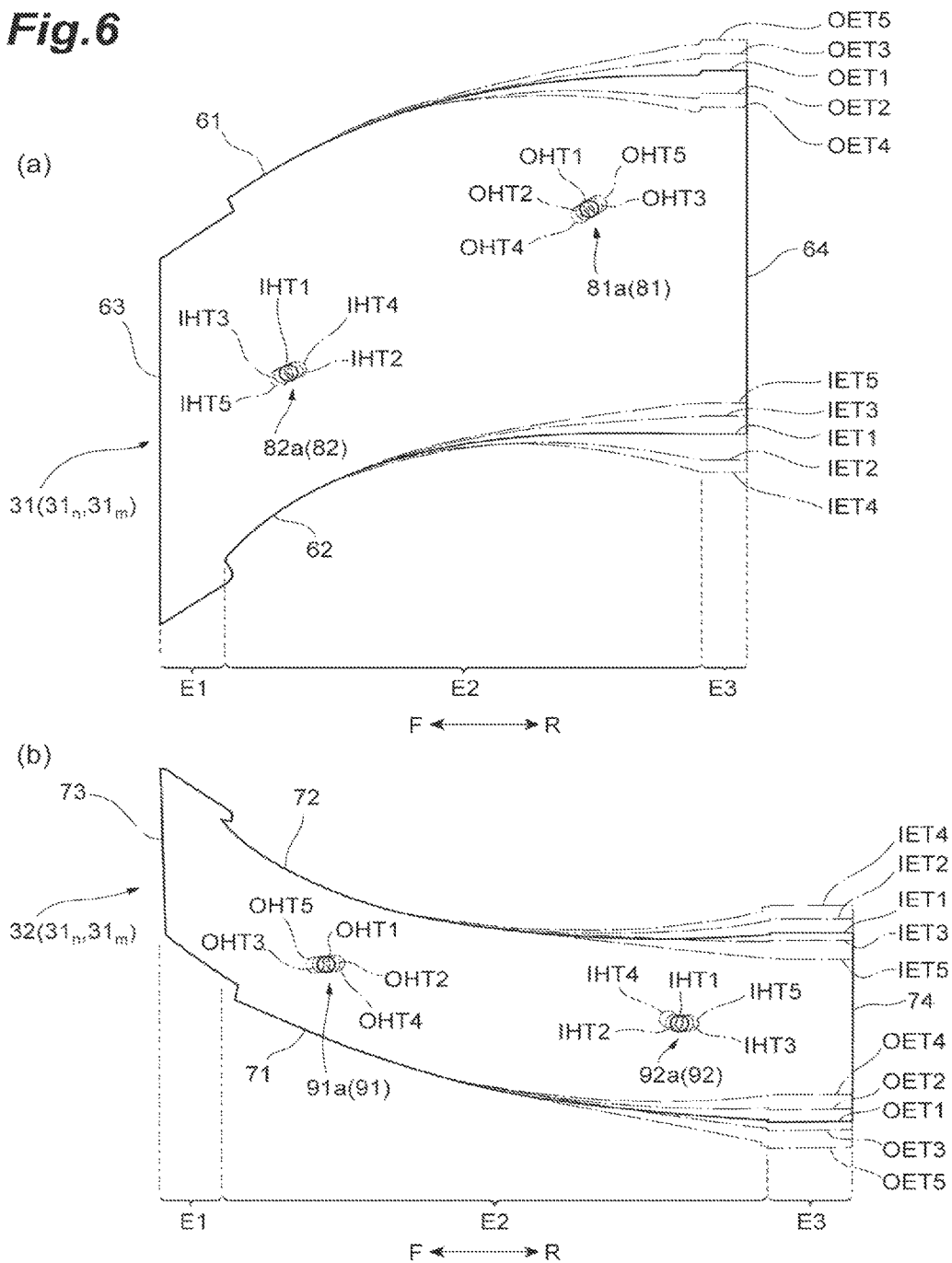
FIG. 6(a) shows an outer shape of the outer straightening plate and FIG. 6(b) shows an outer shape of the inner straightening plate.

Next, the type of the stator vane and the straightening plate of the stator-vane structure 100 according to the embodiment will be described. FIG. 5(a) shows a cross-sectional shape of the stator vane 30 at the attachment position of the outer straightening plate 31 and FIG. 5(b) shows a cross-sectional shape of the stator vane 30 at the attachment position of the inner straightening plate 32. FIG. 6(a) shows an outer shape of the outer straightening plate 31 and FIG. 6(b) shows an outer shape of the inner straightening plate 32. First, the plurality of stator vanes 30 include two or more types of blades each having a different vane type. In the embodiment, as shown in FIG. 5, the plurality of stator vanes 30 includes five vane types. Specifically, as the vane type, a first vane type VT1 which is a normal type and is used as a reference, a second vane type VT2 which is bent by a predetermined angle (for example, +6°) toward the ventral face 30c at the side of the trailing edge 30f with respect to the first vane type VT1, a third vane type VT3 which is bent by a predetermined angle (for example, −6°) toward the dorsal face 30d at the side of the trailing edge 30f with respect to the first vane type VT1, a fourth vane type VT4 which is bent by a predetermined angle (for example, +10°) toward the ventral face 30c at the side of the trailing edge 30f with respect to the first vane type VT1, and a fifth vane type VT5 which is bent by a predetermined angle (for example, −10°) toward the dorsal face 30d at the side of the trailing edge 30f with respect to the first vane type VT1.

Further, as shown in FIG. 6(a), the ventral face side edge portion 61 and the dorsal face side edge portion 62 of the outer straightening plate 31 are formed in five types of shapes corresponding to the vane types. Specifically, as the shape type of the ventral face side edge portion 61, a first shape OET1 which follows the ventral face 30c of the first vane type VT1, a second shape OET2 which follows the ventral face 30c of the second vane type VT2, a third shape OET3 which follows the ventral face 30c of the third vane type VT3, a fourth shape OET4 which follows the ventral face 30c of the fourth vane type VT4, and a fifth shape OET5 which follows the ventral face 30c of the fifth vane type VT5 are employed. As the shape type of the dorsal face side edge portion 62, a first shape IET1 which follows the dorsal face 30d of the first vane type VT1, a second shape IET2 which follows the dorsal face 30d of the second vane type VT2, a third shape IET3 which follows the dorsal face 30d of the third vane type VT3, a fourth shape IET4 which follows the dorsal face 30d of the fourth vane type VT4, and a fifth shape IET5 which follows the dorsal face 30d of the fifth vane type VT5 are employed. Further, as shown in FIG. 6(b), the ventral face side edge portion 71 and the dorsal face side edge portion 72 of the inner straightening plate 32 are formed in five types of shapes corresponding to the vane types. Specifically, as the shape type of the ventral face side edge portion 71, a first shape OET1 which follows the ventral face 30c of the first vane type VT1, a second shape OET2 which follows the ventral face 30c of the second vane type VT2, a third shape OET3 which follows the ventral face 30c of the third vane type VT3, a fourth shape OET4 which follows the ventral face 30c of the fourth vane type VT4, and a fifth shape OET5 which follows the ventral face 30c of the fifth vane type VT5 are employed. As the shape type of the dorsal face side edge portion 72, a first shape IET1 which follows the dorsal face 30d of the first vane type VT1, a second shape IET2 which follows the dorsal face 30d of the second vane type VT2, a third shape IET3 which follows the dorsal face 30d of the third vane type VT3, a fourth shape IET4 which follows the dorsal face 30d of the fourth vane type VT4, and a fifth shape IET5 which follows the dorsal face 30d of the fifth vane type VT5 are employed.

From the above-described configuration, in the outer straightening plate 31 and the inner straightening plate 32, the shapes of the ventral face side edge portions 61 and 71 are set by the vane type of the stator vane 30 on the side of the ventral face 30c and the shapes of the dorsal face side edge portions 62 and 72 are set by the vane type of the stator vane 30 on the side of the dorsal face 30d. Accordingly, the plurality of outer straightening plates 31 and the plurality of inner straightening plates 32 are formed in a plurality of types of shapes by a combination of the vane type of the stator vane 30 on the side of the ventral face 30c and the vane type of the stator vane 30 on the side of the dorsal face 30d. Here, the arrangement of the stator vanes 30 according to the plurality of types of shapes can be appropriately set by the turbo fan engine 1 employing the stator-vane structure 100. For example, in a case where a structure (for example, a pylon accommodating a wiring) is disposed in rear of the stator-vane structure 100, the vane type and the arrangement of the stator vane 30 are adjusted so that a gas avoids the structure. With such an arrangement, where there are M types of combinations of the vane type of the stator vane 30 on the side of the ventral face 30c and the vane type of the stator vane 30 on the side of the dorsal face 30d, M types of shapes are employed as the outer straightening plate 31 and the inner straightening plate 32. Additionally, when there are five vane types of the stator vanes 30, twenty five types of the combinations of the pair of vane types exist and twenty five types of the outer straightening plates 31 and the inner straightening plates 32 exist to maximum. However, a combination of the vane types which are not employed may exist. Additionally, as shown in FIG. 6(a), the shapes of the front edge portion 63 and the first region E1 are common in any type of the outer straightening plate 31. Further, as shown in FIG. 6(b), the shapes of the front edge portion 73 and the first region E1 are common in any type of the inner straightening plate 32.

For example, an array shown in FIG. 7(a) can be employed as the examples of the vane type and the arrangement of the stator vane 30 in the stator-vane structure 100. A stator-vane structure 100A shown in FIG. 7(a) has a combination of thirteen patterns of the stator vanes 30 of "VT1, VT1", "VT1, VT2", "VT1, VT3", "VT2, VT1", "VT2, VT2", "VT2, VT4", "VT3, VT1", "VT3, VT3", "VT3, VT5", "VT4, VT1", "VT4, VT4", "VT5, VT3", and "VT5, VT5" when the "vane type of the stator vane $30_{n-1}$ on the side of the dorsal face and the vane type of the stator vane $30_n$ on the side of the ventral face" are marked. Thus, as the types of the outer straightening plate 31 and the inner straightening plate 32, a first shape LT1 (IET1, OET1), a second shape LT2 (IET1, OET2), a third shape LT3 (IET1, OET3), a fourth shape LT4 (IET2, OET1), a fifth shape LT5 (IET2, OET2), a sixth shape LT6 (IET2, OET4), a seventh shape LT7 (IET3, OET1), an eighth shape LT8 (IET3, OET3), a ninth shape LT9 (IET3, OET5), a tenth shape LT10 (IET4, OET1), an eleventh shape LT11 (IET4, OET4), a twelfth shape LT12 (IET5, OET3), and a thirteenth shape LT13 (IET5, OET5) are employed.

For example, an array shown in FIG. 7(b) can be employed as the examples of the vane type and the arrangement of the stator vane 30 in the stator-vane structure 100. A stator-vane structure 100B shown in FIG. 7(b) has a combination of thirteen patterns of the stator vanes 30 of "VT1, VT1", "VT1, VT2", "VT1, VT3", "VT2, VT1", "VT2, VT2", "VT2, VT4", "VT3, VT1", "VT3, VT3", "VT3, VT5", "VT4, VT4", "VT5, VT3" "VT5, VT5", and "VT4, VT2" when the "vane type of the stator vane $30_{n-1}$ on the side of the dorsal face and the vane type of the stator vane $30_n$ on the side of the ventral face" are marked. Thus, as the types of the outer straightening plate 31 and the inner straightening plate 32, a first shape LT1 (IET1, OET1), a second shape LT2 (IET1, OET2), a third shape LT3 (IET1, OET3), a fourth shape LT4 (IET2, OET1), a fifth shape LT5 (IET2, OET2), a sixth shape LT6 (IET2, OET4), a seventh shape LT7 (IET3, OET1), an eighth shape LT8 (IET3, OET3), a ninth shape LT9 (IET3, OET5), an eleventh shape LT11 (IET4, OET4), a twelfth shape LT12 (IET5, OET3), a thirteenth shape LT13 (IET5, OET5), and a fourteenth shape LT14 (IET4, OET2) are employed. In a stator-vane structure 100B, the tenth shape LT10 used in the stator-vane structure 100A is not used and a fourteenth shape LT14 not used in the stator-vane structure 100A is used.

Among the plurality of types of the straightening plates described above, a straightening plate according to the tenth shape LT10 (IET4, OET1) is a component dedicated for the stator-vane structure 100A and a straightening plate according to the fourteenth shape LT14 (IET4, OET2) is a component dedicated for the stator-vane structure 100B. The other twelve types of the straightening plates can be used as common components of the stator-vane structure 100A and the stator-vane structure 100B. That is, if a plurality of types of the straightening plates are prepared as common components in advance, since the straightening plates involving with the common components can be used when the array of the plurality of types of the stator vanes 30 of the stator-vane structure 100 is designed, a design may be performed so as to obtain desired aerodynamic characteristics. When a combination of the vane types such that in which the straightening plates that are the common component cannot be used, in view of aerodynamic characteristics, a straightening plate involving with a dedicated component may be manufactured. Accordingly, since the straightening plate used in one turbo fan engine can be also used as a common component in the other turbo fan engine, a manufacturing cost of the component can be decreased. Further, in the embodiment, when the plurality of types of the straightening plates are prepared, a straightening plate of which a change in width of a rear edge portion is minimal is selected as a common component. That is, the straightening plates involving with the first, fifth, eighth, eleventh, and thirteenth shapes LT1, LT5, LT8, LT11, and LT13 in which a change in width of the rear edge portion is the smallest are selected as common components and then the straightening plates involving with the second, third, fourth, sixth, seventh, ninth, and twelfth shapes LT2, LT3, LT4, LT6, LT7, LT9, and LT12 in which a change in width of the rear edge portion is small are selected as common components. As described above, when the straightening plate having a small change in width of the rear edge portion is used among the plurality of types of the straightening plates, the stator-vane structure 100 can be mounted on a different pylon shape, that is, a different frame. The pylon shape has also a different structure in a different frame, but if the stator-vane structure 100 according to the embodiment is employed, an assembly can be performed just by the rearrangement of the straightening plates in response to a change in pylon shape. Further, since the straightening plate cannot be fastened by a bolt even when there is an attempt to assemble the straightening plate to an erroneous position during the rearrangement, an erroneous assembly is prevented. Thus, even when limited types of the straightening plates are prepared, the stator-vane structure 100 can be mounted on a plurality of types of frames by the rearrangement.

Next, a structure of preventing an erroneous assembly of the straightening plate in the stator-vane structure 100 according to the embodiment will be described. In the stator-vane structure 100 according to the embodiment, when a combination of the vane type of the stator vane $30_n$ and the vane type of the stator vane $30_{n-1}$ for one outer straightening plate $31_n$ is the same as a combination of the vane type of the stator vane $30_m$ and the vane type of the stator vane $30_{m-1}$ for the other outer straightening plate $31_m$, the positions of the first straightening plate side connection portions 81 of one outer straightening plate $31_n$ and the other outer straightening plate $31_m$ are the same as each other and the positions of the second straightening plate side connection portions 82 of one outer straightening plate $31_n$ and the other outer straightening plate $31_m$ are the same as each other. Additionally, m is 2 to N. Here, m is a natural number other than n. When a combination of the vane type of the stator vane $30_n$ and the vane type of the stator vane $30_{n-1}$ for one outer straightening plate $31_n$ is the same as a combination of the vane type of the stator vane $30_m$ and the vane type of the stator vane $30_{m-1}$ for the other outer straightening plate $31_m$, a combination of the shape type of the ventral face side edge portion 61 and the shape type of the dorsal face side edge portion 62 for one outer straightening plate $31_n$ is the same as a combination of the shape type of the ventral face side edge portion 61 and the shape type of the dorsal face side edge portion 62 for the other outer straightening plate $31_m$ and the shape type of one outer straightening plate $31_n$ is the same as the shape type of the other outer straightening plate $31_m$. That is, when the outer straightening plate $31_n$ and the outer straightening plate $31_m$ are of the same shape type, the positions of the first straightening plate side connection portions 81 and the second straightening plate side connection portions 82 are the same as each other. In the embodiment, the positions of the through-holes 81a and 82a of the outer straightening plate $31_n$ are the same as the positions of the through-holes 81a and 82a of the outer straightening plate $31_m$.

Figure 9:
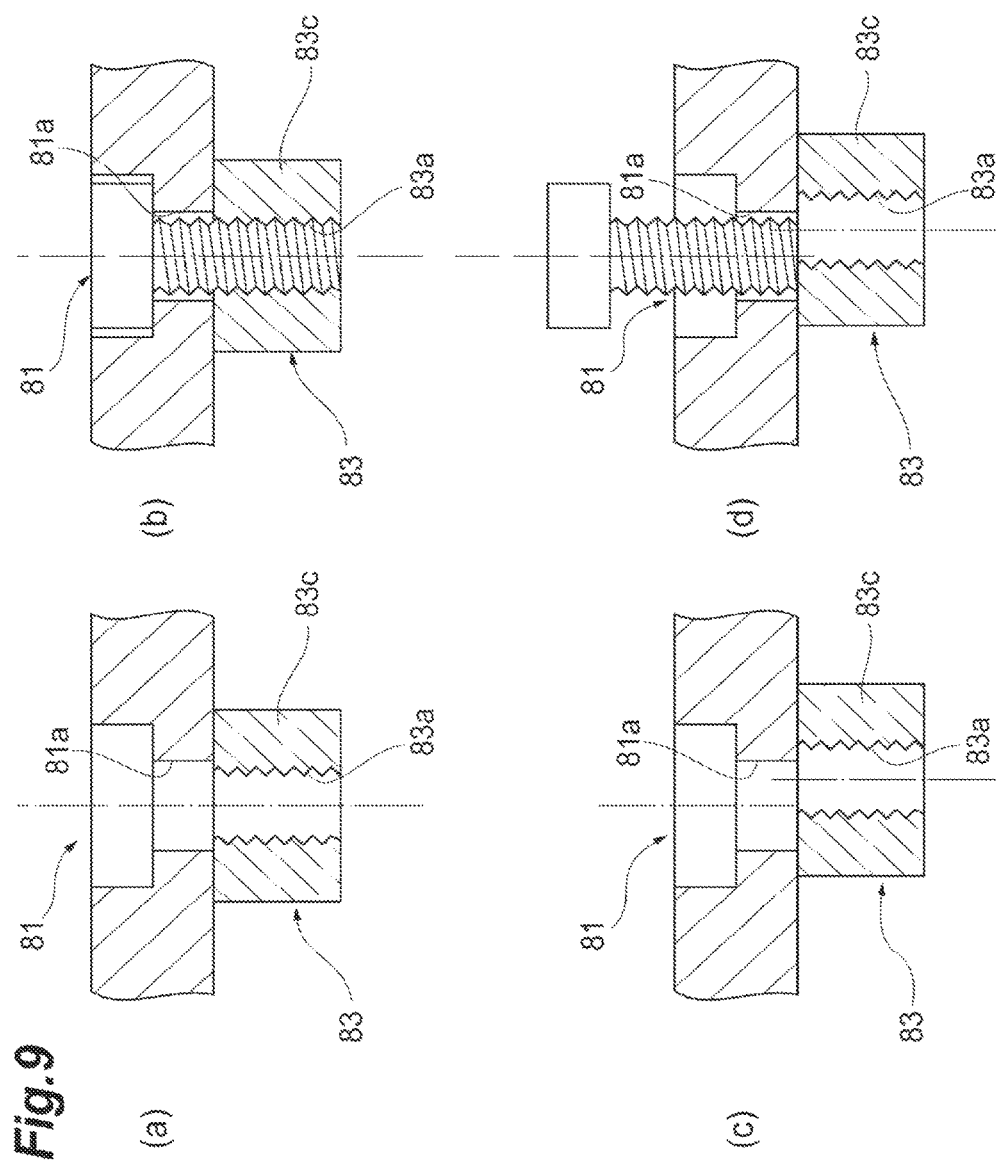
FIGS. 9(a) and 9(b) are schematic diagrams showing a state where a stator vane side connection portion is disposed at a position corresponding to a straightening plate side connection portion and FIGS. 9(c) and 9(d) are schematic diagrams showing a state where a stator vane side connection portion is disposed at a position deviating from a straightening plate side connection portion.

Further, when the other outer straightening plate $31_m$ is attached between the stator vane $30_n$ and the stator vane $30_{n-1}$ for one outer straightening plate $31_n$, the first stator vane side connection portion 83 is provided at a position corresponding to the first straightening plate side connection portion 81 of the outer straightening plate $31_m$ and the second stator vane side connection portion 84 is provided at a position corresponding to the second straightening plate side connection portion 82 of the outer straightening plate $31_m$. In the embodiment, the through-hole 81a of the outer straightening plate $31_m$ communicates with the bolt hole 83a of the first stator vane side connection portion 83 of the stator vane $30_n$ so that a bolt can be fastened thereto. Further, the through-hole 82a of the outer straightening plate $31_m$ communicates with the bolt hole 84a of the second stator vane side connection portion 84 of the stator vane $30_{n-1}$ so that a bolt can be fastened thereto. That is, a "position corresponding to the first straightening plate side connection portion" in the first stator vane side connection portion 83 is a connectable position where the position of the first straightening plate side connection portion 81 matches the position of the first stator vane side connection portion 83 when the outer straightening plate 31 is disposed between the pair of stator vanes 30. Additionally, the same applies to the other stator vane side connection portion. For example, as shown in FIGS. 9(a) and 9(b), the center line of the through-hole 81a of the outer straightening plate 31 substantially matches the center line of the bolt hole 83a of the first stator vane side connection portion 83 of the stator vane 30 (the center lines may deviate from each other within a range of a manufacturing error or the like) and a bolt passing through the through-hole 81a is fastened to the bolt hole 83a.

Further, when a combination of the vane type of the stator vane $30_n$ and the vane type of the stator vane $30_{n-1}$ for one outer straightening plate $31_n$ is different from a combination of the vane type of the stator vane $30_m$ and the vane type of the stator vane $30_{m-1}$ for the other outer straightening plate $31_m$, at least one of the positions of the first straightening plate side connection portions 81 of one outer straightening plate $31_n$ and the other outer straightening plate $31_m$ and the positions of the second straightening plate side connection portions 82 of one outer straightening plate $31_n$ and the other outer straightening plate $31_m$ are different from each other. When a combination of the vane type of the stator vane $30_n$ and the vane type of the stator vane $30_{n-1}$ for one outer straightening plate $31_n$ is different from a combination of the vane type of the stator vane $30_m$ and the vane type of the stator vane $30_{m-1}$ for the other outer straightening plate $31_m$, a combination of the shape type of the ventral face side edge portion 61 and the shape type of the dorsal face side edge portion 62 of one outer straightening plate $31_n$ is different from a combination of the shape type of the ventral face side edge portion 61 and the shape type of the dorsal face side edge portion 62 of the other outer straightening plate $31_m$ and the shape type of one outer straightening plate $31_n$ is different from the shape type of the outer straightening plate $31_m$. That is, when the outer straightening plate $31_n$ and the outer straightening plate $31_m$ are of different shape types, at least one of the positions of the first straightening plate side connection portions 81 of one outer straightening plate $31_n$ and the other outer straightening plate $31_m$ and the positions of the second straightening plate side connection portions 82 of one outer straightening plate $31_n$ and the other outer straightening plate $31_m$ are different from each other. In the embodiment, at least one of the positions of the through-hole 81a of the outer straightening plate $31_n$ and the through-hole 81a of the outer straightening plate $31_m$ and the positions of the through-hole 82a of the outer straightening plate $31_n$ and the through-hole 82a of the outer straightening plate $31_m$ are different from each other. Here, when the shape type of the ventral face side edge portion 61 of one outer straightening plate $31_n$ is the same as the shape type of the ventral face side edge portion 61 of the other outer straightening plate $31_m$ and the shape type of the dorsal face side edge portion 62 of one outer straightening plate $31_n$ is different from the shape type of the dorsal face side edge portion 62 of the other outer straightening plate $31_m$, the positions of the first straightening plate side connection portions 81 of one outer straightening plate $31_n$ and the other outer straightening plate $31_m$ are the same as each other and the positions of the second straightening plate side connection portions 82 of one outer straightening plate $31_n$ and the other outer straightening plate $31_m$ are different from each other. Alternatively, when the shape type of the ventral face side edge portion 61 of one outer straightening plate $31_n$ is different from the shape type of the ventral face side edge portion 61 of the other outer straightening plate $31_m$ and the shape type of the dorsal face side edge portion 62 of one outer straightening plate $31_n$ is the same as the shape type of the dorsal face side edge portion 62 of the other outer straightening plate $31_m$, the positions of the first straightening plate side connection portions 81 of one outer straightening plate $31_n$ and the other outer straightening plate $31_m$ are different from each other and the positions of the second straightening plate side connection portions 82 of one outer straightening plate $31_n$ and the other outer straightening plate $31_m$ are the same as each other.

Further, when the other outer straightening plate $31_m$ is attached between the stator vane $30_n$ and the stator vane $30_{n-1}$ for one outer straightening plate $31_n$, at least one of the position of the first stator vane side connection portion 83 for the first straightening plate side connection portion 81 of the outer straightening plate $31_m$ and the position of the second stator vane side connection portion 84 for the second straightening plate side connection portion 82 of the outer straightening plate $31_m$ deviates and the position of stator vane side connection portion does not correspond to the straightening plate side connection portion. A "state where the position of the stator vane side connection portion does not correspond to the straightening plate side connection portion" indicates a state where the position of the straightening plate side connection portion and the position of the stator vane side connection portion are different from each other to a degree in which the straightening plate side connection portion and the stator vane side connection portion cannot be connected to each other. In the embodiment, the position of the center line of the through-hole 81a of the outer straightening plate $31_m$ deviates from the position of the center line of the bolt hole 83a of the first stator vane side connection portion 83 of the stator vane $30_n$ and thus both components cannot be fastened to each other by a bolt. Further, the position of the center line of the through-hole 82a of the outer straightening plate $31_m$ deviates from the position of the center line of the bolt hole 84a of the second stator vane side connection portion 84 of the stator vane $30_{n-1}$ and thus both components cannot be fastened to each other by a bolt. For example, as shown in FIGS. 9(c) and 9(d), when the center line of the through-hole 81a of the outer straightening plate $31_m$ does not match the center line of the bolt hole 83a of the first stator vane side connection portion 83 of the stator vane $30_n$ and a bolt passing through the through-hole 81a interferes with an edge of the bolt hole 83a, the bolt cannot be fastened to the bolt hole 83a. Additionally, a "state where the positions of the straightening plate side connection portions of one straightening plate and the other straightening plate are different" indicates a state where the connection portions 81 and 83 cannot be connected to each other due to a state shown in FIG. 9(c), for example, on the assumption that the position of the first straightening plate side connection portion 81 of one outer straightening plate $31_n$ is changed to that of the other outer straightening plate $31_m$. For example, when the state of FIG. 9(a) is viewed from the center line direction, the entirety of the bolt hole 83a is exposed through the through-hole 81a as shown in FIG. 10(a). On the contrary, when the state of FIG. 9(c) is viewed from the center line direction, a part of the bolt hole 83a overlaps an edge of the through-hole 81a as shown in FIG. 10(b). At this time, when a dimension L1 of a minimal diameter of the exposed portion of the bolt hole 83a is smaller than a diameter of a bolt, the bolt cannot pass through the bolt hole 83a. From the description above, the center line of the through-hole 81 of one outer straightening plate $31_n$ may deviate from the center line of the through-hole 81 of the other outer straightening plate $31_m$ to a degree in which the dimension L1 shown in FIG. 10(b) becomes smaller than the diameter of the bolt. Additionally, if the connection portions 81 and 83 can be connected to each other within a range of a manufacturing error even when the center lines of the through-holes 81a of one outer straightening plate $31_n$ and the other outer straightening plate $31_m$ deviate from each other, this state corresponds to a "state where the positions of the straightening plate side connection portions of one straightening plate and the other straightening plate are the same as each other."

Additionally, a reference for determining whether the positions of the straightening plate side connection portions 81 and 82 at one outer straightening plate $31_n$ are the same as or different from the positions of the straightening plate side connection portions 81 and 82 at the other outer straightening plate $31_m$ is not particularly limited. For example, in the embodiment, the shape of the front edge portion 63 (and the first region E1) of the outer straightening plate 31 is common regardless of the vane type. Thus, the positions of the straightening plate side connection portions 81 and 82 may be determined on the basis of such a common shape portion. Further, one outer straightening plate $31_n$ and the other outer straightening plate $31_m$ may overlap each other in order to determine whether the positions of the straightening plate side connection portions 81 and 82 are the same as or different from each other. In a case where those plates overlap each other, as shown in FIG. 6(a), both plates overlap each other in a posture in which the reference positions (or the reference lines) of one outer straightening plate $31_n$ and the other outer straightening plate $31_m$ match each other. In the embodiment, the positions may match each other by using the front edge portion 63 as a reference or may match each other by using the reference line set as described above as a reference.

When a combination of the vane type of the stator vane $30_n$ and the vane type of the stator vane $30_{n-1}$ for one inner straightening plate $32_n$ is the same as a combination of the vane type of the stator vane $30_m$ and the vane type of the stator vane $30_{m-1}$ for the other inner straightening plate $32_m$, the positions of the first straightening plate side connection portions 91 of one inner straightening plate $32_n$ and the other inner straightening plate $32_m$ are the same as each other and the positions of the second straightening plate side connection portions 92 of one inner straightening plate $32_n$ and the other inner straightening plate $32_m$ are the same as each other. When a combination of the vane type of the stator vane $30_n$ and the vane type of the stator vane $30_{n-1}$ for one inner straightening plate $32_n$ is different from a combination of the vane type of the stator vane $30_m$ and the vane type of the stator vane $30_{m-1}$ for the other inner straightening plate $32_m$, at least one of the positions of the first straightening plate side connection portions 91 of one inner straightening plate $32_n$ and the other inner straightening plate $32_m$ and the positions of the second straightening plate side connection portions 92 of one inner straightening plate $32_n$ and the other inner straightening plate $32_m$ are different from each other.

Additionally, since the same relation as that of the outer straightening plate 31 is also established in the inner straightening plate 32, a detailed description thereof will be omitted.

When the vane type of one stator vane $30_n$ is the same as the vane type of the other stator vane $30_m$ the positions of the first stator vane side connection portions 83 and 93 of one stator vane $30_n$ and the other stator vane $30_m$ are the same as each other and the positions of the second stator vane side connection portions 84 and 94 at one stator vane $30_n$ and the other stator vane $30_m$ are the same as each other. Further, when the vane type of one stator vane $30_n$ is different from the vane type of the other stator vane $30_m$, the positions of the first stator vane side connection portions 83 and 93 of one stator vane $30_n$, and the other stator vane $30_m$ are different from each other and the positions of the second stator vane side connection portions 84 and 94 of one stator vane $30_n$ and the other stator vane $30_m$ are different from each other. Specifically, as shown in FIGS. 5(a) and 5(b), in the stator vane 30 involving with the vane type VT1, the positions of the bolt holes 83a and 93a of the first stator vane side connection portions 83 and 93 are determined at a position OHT1 and the positions of the bolt holes 84a and 94a of the second stator vane side connection portions 84 and 94 are determined at a position IHT1. The positions of the bolt holes 83a, 93a, 84a, and 94a of the stator vane 30 involving with the vane type VT1 in the stator-vane structure 100 are determined by the positions OHT1 and IHT1. Similarly, in the stator vane 30 involving with the vane types VT2, VT3, VT4, and VT5, the positions of the bolt holes 83a and 93a of the first stator vane side connection portions 83 and 93 are determined by the positions OHT2, OHT3, OHT4, and OHT5 and the positions of the bolt holes 84a and 94a of the second stator vane side connection portions 84 and 94 are determined by the positions IHT2, IHT3, IHT4, and IHT5. Further, the positions OHT1, OHT2, OHT3, OHT4, and OHT5 for the vane types VT1, VT2, VT3, VT4, and VT5 are set to different positions and the positions IHT1, IHT2, IHT3, IHT4, and IHT5 are set to different positions (a detailed description will be made below).

Further, when the shapes of the ventral face side edge portions 61 and 71 of one straightening plates $31_n$ and $32_n$ are the same as the shapes of the ventral face side edge portions 61 and 71 of the other straightening plates $31_m$ and $32_m$, the positions of the first straightening plate side connection portions 81 and 91 of one straightening plates $31_n$ and $32_n$ and the other straightening plates $31_m$ and $32_m$ are the same as each other regardless of the shapes of the dorsal face side edge portions 62 and 72 of one straightening plates $31_n$ and $32_n$ and the shapes of the dorsal face side edge portions 62 and 72 of the other straightening plates $31_m$ and $32_m$. When the shapes of the dorsal face side edge portions 62 and 72 of one straightening plates $31_n$ and $32_n$ are the same as the shapes of the dorsal face side edge portions 62 and 72 of the other straightening plates $31_m$ and $32_m$, the positions of the second straightening plate side connection portions 82 and 92 of one straightening plates $31_n$ and $32_n$ and the other straightening plates $31_m$ and $32_m$ are the same as each other regardless of the shapes of the ventral face side edge portions 61 and 71 of one straightening plates $31_n$ and $32_n$ and the shapes of the ventral face side edge portions 61 and 71 of the other straightening plates $31_m$ and $32_m$. Further, when the shapes of the ventral face side edge portions 61 and 71 of one straightening plates $31_n$ and $32_n$ are different from the shapes of the ventral face side edge portions 61 and 71 of the other straightening plates $31_m$ and $32_m$, the positions of the first straightening plate side connection portions 81 and 91 of one straightening plates $31_n$ and $32_n$ and the other straightening plates $31_m$ and $32_m$ are different from each other. When the shapes of the dorsal face side edge portions 62 and 72 of one straightening plates $31_n$ and $32_n$ are different from the shapes of the dorsal face side edge portions 62 and 72 of the other straightening plates $31_m$ and $32_m$, the positions of the second straightening plate side connection portions 82 and 92 at one straightening plates $31_n$ and $32_n$ and the other straightening plates $31_m$ and $32_m$ are different from each other. Specifically, as shown in FIGS. 6(a) and 6(b), in the ventral face side edge portions 61 and 71 involving with the shape OET1, the positions of the through-holes 81a and 91a of the first straightening plate side connection portions 81 and 91 are determined by the position OHT1. In the dorsal face side edge portions 62 and 72 involving with the shape IET1, the positions of the through-holes 82a and 92a of the second straightening plate side connection portions 82 and 92 are determined by the position IHT1. The positions of the through-holes 81a and 91a of the ventral face side edge portions 61 and 71 involving with the shape OET1 in the stator-vane structure 100 are determined by the position OHT1. The positions of the through-holes 82a and 92a of the dorsal face side edge portions 62 and 72 involving with the shape IET1 in the stator-vane structure 100 are determined by the position IHT1. Similarly, the positions of the through-holes 81a and 91a for the ventral face side edge portions 61 and 71 involving with the shapes OET2, OET3, OET4, and OET5 are determined by the positions OHT2, OHT3, OHT4, and OHT5. The positions of the through-holes 82a and 92a for the dorsal face side edge portions 62 and 72 involving with the shapes IET2, IET3, IET4, and IET5 are determined by the positions IHT2, IHT3, IHT4, and IHT5. Further, the positions OHT1, OHT2, OHT3, OHT4, and OHT5 for the ventral face side edge portions 61 and 71 involving with the shapes OET1, OET2, OET3, OET4, and OET5 are set to different positions and the positions IHT1, IHT2, IHT3, IHT4, and IHT5 for the dorsal face side edge portions 62 and 72 involving with the shapes IET1, IET2, IET3, IET4, and IET5 are set to different positions (a detailed description will be made below).

Further, when the vane type of one stator vane $30_n$ is different from the vane type of the other stator vane $30_m$, the first stator vane side connection portions 83 and 93 of the other stator vane $30_m$ is provided at a front side of the first stator vane side connection portions 83 and 93 of one stator vane $30_n$ and the second stator vane side connection portions 84 and 94 of the other stator vane $30_m$ are provided at a rear side of the second stator vane side connection portions 84 and 94 of one stator vane $30_n$. When the ventral face side stator vane $30_n$ for one straightening plates $31_n$ and $32_n$ is one vane type and the ventral face side stator vane $30_m$ for the other straightening plates $31_m$ and $32_m$ is the other vane type, the first straightening plate side connection portions 81 and 91 of the other straightening plates $31_m$ and $32_m$ are provided at a front side of the first straightening plate side connection portions 81 and 91 of one straightening plates $31_n$ and $32_n$. Further, when the dorsal face side stator vane $30_{n-1}$ for one straightening plates $31_n$ and $32_n$ is one vane type and the dorsal face side stator vane $30_{m-1}$ for the other straightening plates $31_m$ and $32_m$ is the other vane type, the second straightening plate side connection portions 82 and 92 of the other straightening plates $31_m$ and $32_m$ are provided in rear of the second straightening plate side connection portions 82 and 92 of one straightening plates $31_n$ and $32_n$.

Specifically, as shown in FIG. 5(a), the bolt hole 83a of the second vane type VT2 is provided at the position OHT2 in front of the position OHT1 of the bolt hole 83a of the first vane type VT1. The bolt hole 84a of the second vane type VT2 is provided at the position IHT2 in rear of the position IHT1 of the bolt hole 84a of the first vane type VT1. The bolt hole 83a of the third vane type VT3 is provided at the position OHT3 in rear of the position OHT1. The bolt hole 84a of the third vane type VT3 is provided at the position IHT3 in front of the position IHT1. The bolt hole 83a of the fourth vane type VT4 is provided at the position OHT4 in front of the position OHT1 and the position OHT2. The bolt hole 84a of the fourth vane type VT4 is provided at the position IHT4 in rear of the position IHT1 and the position IHT2. The bolt hole 83a of the fifth vane type VT5 is provided at the position OHT5 in rear of the position OHT1 and the position OHT3. The bolt hole 84a of the fifth vane type VT5 is provided at the position IHT5 in front of the position IHT1 and the position IHT3. The widening angle of the trailing edge 30f of the stator vane 30 increases in order of the vane types VT4, VT2, VT1, VT3, and VT5. On the contrary, the position of the rear bolt hole 83a is set in order of the positions OHT4, OHT2, OHT1, OHT3, and OHT5 from the front side toward the rear side. Further, the position of the front bolt hole 84a is set in order of the positions IHT4, IHT2, IHT1, IHT3, and IHT5 from the front side toward the rear side in a manner opposite to the bolt hole 83a. Here, the position of the rear bolt hole 83a may sequentially change from the rear side toward the front side and the position of the front bolt hole 84a may sequentially change from the rear side toward the front side. Further, the position of the bolt hole may change in random regardless of the sequence in response to the angle of such a stator vane 30. Further, when the lengths of the arm portions 83b and 84b and the angles of the arm portions 83b and 84b with respect to the protrusion portions 46 and 48 are adjusted, the positions of the bolt holes 83a and 84a are set.

As shown in FIG. 6(a), the through-hole 81a for the second shape OET2 of the ventral face side edge portion 61 is provided at the position OHT2 in front of the position OHT1 of the through-hole 81a for the first shape OET1. The through-hole 82a for the second shape IET2 of the dorsal face side edge portion 62 is provided at the position IHT2 in rear of the position IHT1 of the through-hole 82a for the first shape IET1 (additionally, in this case, a first vane type corresponds to "one vane type" of claims and a second vane type corresponds to the "another vane type" of claims). The through-hole 81a for the third shape OET3 is provided at the position OHT3 in rear of the position OHT1. The through-hole 82a for the third shape IET3 is provided at the position IHT3 in front of the position IHT1 (additionally, in this case, a third vane type corresponds to "one vane type" of claims and a first vane type corresponds to the "another vane type" of claims). The through-hole 81a for the fourth shape OET4 is provided at the position OHT4 in front of the position OHT1 and the position OHT2. The through-hole 82a for the fourth shape IET4 is provided at the position IHT4 in rear of the position IHT1 and the position IHT2. The through-hole 81a for the fifth shape OET5 is provided at the position OHT5 in rear of the position OHT1 and the position OHT3. The through-hole 82a for the fifth shape IET5 is provided at the position IHT5 in front of the position IHT1 and the position IHT3.

Further, as shown in FIG. 5(b), the bolt hole 93a of the second vane type VT2 is provided at the position OHT2 in rear of the position OHT1 of the bolt hole 93a of the first vane type VT1. The bolt hole 94a of the second vane type VT2 is provided at the position IHT2 in front of the position IHT1 of the bolt hole 94a of the first vane type VT1. The bolt hole 93a of the third vane type VT3 is provided at the position OHT3 in front of the position OHT1. The bolt hole 94a of the third vane type VT3 is provided at the position IHT3 in rear of the position IHT1. The bolt hole 93a of the fourth vane type VT4 is provided at the position OHT4 in rear of the position OHT1 and the position OHT2. The bolt hole 94a of the fourth vane type VT4 is provided at the position IHT4 in front of the position IHT1 and the position IHT2. The bolt hole 93a of the fifth vane type VT5 is provided at the position OHT5 in front of the position OHT1 and the position OHT3. The bolt hole 94a of the fifth vane type VT5 is provided at the position IHT5 in rear of the position IHT1 and the position IHT3. The widening angle of the trailing edge 30f of the stator vane 30 increases in order of the vane types VT4, VT2, VT1, VT3, and VT5. On the contrary, the position of the front bolt hole 93a is set in order of the positions OHT4, OHT2, OHT1, OHT3, and OHT5 from the rear side toward the front side. Further, the position of the rear bolt hole 94a is set in order of the positions IHT4, IHT2, IHT1, IHT3, and IHT5 from the front side toward the rear side in a manner opposite to the bolt hole 93a. Here, the position of the rear bolt hole 93a may sequentially change from the rear side toward the front side and the position of the front bolt hole 94a may sequentially change from the rear side toward the front side. Further, the position of the bolt hole may change in random regardless of the sequence in response to the angle of such a stator vane 30. Further, when the length of the arm portion 93b and the angle of the arm portion 93b with respect to the protrusion portion 54 are adjusted, the position of the bolt hole 93a is set. When the position of the fastening portion 94c with respect to the protrusion portion 59 is adjusted, the position of the bolt hole 94a is set.

As shown in FIG. 6(b), the through-hole 91a for the second shape OET2 of the ventral face side edge portion 71 is provided at the position OHT2 in rear of the position OHT1 of the through-hole 91a for the first shape OET1. The through-hole 92a for the second shape IET2 of the dorsal face side edge portion 72 is provided at the position IHT2 in front of the position IHT1 of the through-hole 92a for the first shape IET1. The through-hole 91a for the third shape OET3 is provided at the position OHT3 in front of the position OHT1 and the through-hole 92a for the third shape IET3 is provided at the position IHT3 in rear of the position IHT1. The through-hole 91a for the fourth shape OET4 is provided at the position OHT4 in rear of the position OHT1 and the position OHT2. The through-hole 92a for the fourth shape IET4 is provided at the position IHT4 in front of the position IHT1 and the position IHT2. The through-hole 91a for the fifth shape OET5 is provided at the position OHT5 in front of the position OHT1 and the position OHT3. The through-hole 92a for the fifth shape IET5 is provided at the position IHT5 in rear of the position IHT1 and the position IHT3.

For example, when the ventral face side edge portion 61 is disposed along the ventral face 30c of the first vane type VT1, the through-hole 81a and the bolt hole 83a of the first stator vane side connection portion 83 are disposed at the same position so that a bolt can be inserted thereinto in a case where the ventral face side edge portion 61 has the first shape OET1 and the through-hole 81a of the first straightening plate side connection portion 81 is provided at the position OHT1. Meanwhile, when the ventral face side edge portion 61 has any one of the second, third, fourth, and fifth shapes OET2, OET3, OET4, and OET5 and the through-hole 81a of the first straightening plate side connection portion 81 is located at any one of the positions OHT2, OHT3, OHT4, and OHT5, the through-hole 81a and the bolt hole 83a deviated from each other so that a bolt cannot be inserted thereinto. Similarly, when the dorsal face side edge portion 62 is disposed along the dorsal face 30d of the first vane type VT1, the through-hole 82a and the bolt hole 84a of the second stator vane side connection portion 84 are disposed at the same position so that a bolt can be inserted thereinto in a case where the dorsal face side edge portion 62 has the first shape IET1 and the through-hole 82a of the second straightening plate side connection portion 82 is provided at the position IHT1. Meanwhile, when the dorsal face side edge portion 62 has any one of the second, third, fourth, and fifth shapes IET2, IET3, IET4, and IET5 and the through-hole 82a of the second straightening plate side connection portion 82 is located at any one of the positions IHT2, IHT3, IHT4, and IHT5, the through-hole 82a and the bolt hole 84a deviate from each other so that a bolt cannot be inserted thereinto. The same relation is also satisfied among the through-holes 81a, 82a, 91a, and 92a and the bolt holes 83a, 84a, 93a, and 94a at different positions.

Next, a configuration of visually preventing an erroneous assembly of the straightening plate will be described. FIG. 8(a) is an enlarged view of a configuration in the vicinity of the first stator vane side connection portion 83 and FIG. 8(b) is an enlarged view of a configuration in the vicinity of the second stator vane side connection portion 94. As shown in FIG. 8(a), each of the plurality of stator vanes 30 is provided with a stator vane side identification portion MK1 which helps the visual recognition of the vane type of the stator vane 30. Further, as shown in FIGS. 3 and 4, each of the plurality of straightening plates 31 and 32 is provided with a straightening plate side identification portion MK2 which helps a visual recognition of the vane type of the ventral face side stator vane 30 and the vane type of the dorsal face side stator vane 30. The stator vane side identification portion MK1 may be formed at any portion of the stator vane 30, but may be formed at a position which is easily viewed by an operator when the straightening plates 31 and 32 are assembled. For example, as shown in FIG. 8(a), in the ventral face side stator vane 30, the stator vane side identification portion MK1 may be formed at an end face of the protrusion portion 46 protruding from the ventral face. Further, in the dorsal face side stator vane 30, the stator vane side identification portion MK1 may be formed at an end face of the protrusion portion 49 protruding from the dorsal face. Further, as shown in FIG. 8(b), in the ventral face side stator vane 30, the stator vane side identification portion MK1 may be formed at the outer circumferential side end face of the protrusion portion 59 protruding from the ventral face. Further, in the dorsal face side stator vane 30, the stator vane side identification portion MK1 may be formed at an end face of the protrusion portion 56 protruding from the dorsal face. Additionally, in FIG. 8, the number (for example, "1" in the case of the first vane type) of the vane type of the stator vane 30 is shown as the stator vane side identification portion MK1, but the display content is not particularly limited. Further, the straightening plate side identification portion MK2 may be formed at any portion of the straightening plates 31 and 32, but may be formed at a position which is easily viewed by an operator when the straightening plates 31 and 32 are assembled. For example, as shown in FIGS. 3 and 4, the straightening plate side identification portion MK2 may be formed at the dorsal faces of the straightening plates 31 and 32. Additionally, in FIGS. 3 and 4, the number (for example, "1-2" in the case of the combination of the first vane type and the second vane type) of the vane type of the ventral face side stator vane 30 and the number of the vane type of the dorsal face side stator vane 30 are shown as the straightening plate side identification portion MK2, but the display content is not particularly limited.

Next, an operation and an effect of the stator-vane structure 100 according to the embodiment will be described.

In the stator-vane structure 100 according to the embodiment, when a combination of the vane type of the stator vane $30_n$ and the vane type of the stator vane $30_{n-1}$ for one straightening plates $31_n$ and $32_n$ is the same as a combination of the vane type of the stator vane $30_m$ and the vane type of the stator vane $30_{m-1}$ for the other straightening plates $31_m$ and $32_m$, the positions of the first straightening plate side connection portions 81 and 91 at one straightening plates $31_n$ and $32_n$ and the other straightening plates $31_m$ and $32_m$ are the same as each other and the positions of the second straightening plate side connection portions 82 and 92 at one straightening plates $31_n$ and $32_n$ and the other straightening plates $31_m$ and $32_m$ are the same as each other. That is, when the shapes of one straightening plates $31_n$ and $32_n$ are the same as the shapes of the other straightening plates $31_m$ and $32_m$, the positions of the first straightening plate side connection portions 81 and 91 and the second straightening plate side connection portions 82 and 92 are the same as each other. Thus, the first stator vane side connection portions 83 and 93 of the stator vane $30_n$ and the second stator vane side connection portions 84 and 94 of the stator vane $30_{n-1}$ for one straightening plates $31_n$ and $32_n$ are provided at positions respectively corresponding to the first straightening plate side connection portions 81 and 91 and the second straightening plate side connection portions 82 and 92 of one straightening plates $31_n$ and $32_n$. Thus, the straightening plates can be connected by the first straightening plate side connection portions 81 and 91 and the second straightening plate side connection portions 82 and 92 of the other straightening plates $31_m$ and $32_m$. Accordingly, when the shape of any one of the straightening plates 31 and 32 of the stator-vane structure 100 corresponds to a combination of the vane shape of the ventral face side stator vane 30 and the vane type of the dorsal face side stator vane 30, the straightening plate side connection portions 81, 91, 82, and 92 and the stator vane side connection portions 83, 93, 84, and 94 cannot be connected to one another. Thus, each of the plurality of straightening plates 31 and 32 can be assembled between the pair of stator vanes 30 at any position of the stator-vane structure 100 as long as the shape corresponds to the above-described combination.

Here, there is a possibility that an operator may conduct an erroneous assembly when the positions of the first straightening plate side connection portions 81 and 91 and the second straightening plate side connection portions 82 and 92 are the same as each other regardless of whether the shapes of one straightening plates $31_n$ and $32_n$ and the other straightening plates $31_m$ and $32_m$ are different from each other. That is, since the first stator vane side connection portions 83 and 93 of the stator vane $30_n$ and the second stator vane side connection portions 84 and 94 of the stator vane $30_{n-1}$ for one straightening plates $31_n$ and $32_n$ are disposed at the positions corresponding to the first straightening plate side connection portions 81 and 91 and the second straightening plate side connection portions 82 and 92 of the other straightening plates $31_m$ and $32_m$, there is a possibility that the straightening plates may be connected in accordance with an assembling method. In the case of an erroneous assembly, there is a possibility that the straightening plates 31 and 32 may be distorted between the pair of stator vanes 30 and aerodynamic characteristics may be influenced. Alternatively, there is a possibility that the components may be damaged due to a forced assembly.

Meanwhile, in the stator-vane structure 100 according to the embodiment, when a combination of the vane type of the stator vane $30_n$ and the vane type of the stator vane $30_{n-1}$ for one straightening plates $31_n$ and $32_n$ is different from a combination of the vane type of the stator vane $30_m$ and the vane type of the stator vane $30_{m-1}$ for the other straightening plates $31_m$ and $32_m$, at least one of the first straightening plate side connection portions 81 and 91 of one straightening plates $31_n$ and $32_n$ and the other straightening plates $31_m$ and $32_m$ and the positions of the second straightening plate side connection portions 82 and 92 of one straightening plates $31_n$ and $32_n$ and the other straightening plates $31_m$ and $32_m$ are different from each other. That is, when the shapes of one straightening plates $31_n$ and $32_n$ and the other straightening plates $31_m$ and $32_m$ are different from each other, at least one of the positions of the first straightening plate side connection portions 81 and 91 and the positions of the second straightening plate side connection portions 82 and 92 are different from each other. Thus, since the first stator vane side connection portions 83 and 93 of the stator vane $30_n$ and the second stator vane side connection portions 84 and 94 of the stator vane $30_{n-1}$ for one straightening plates $31_n$ and $32_n$ are provided at positions respectively corresponding to the first straightening plate side connection portions 81 and 91 and the second straightening plate side connection portions 82 and 92 of one straightening plates $31_n$ and $32_n$, the connection portions do not correspond to the positions of the first straightening plate side connection portions 81 and 91 and the second straightening plate side connection portions 82 and 92 of the other straightening plates $31_m$ and $32_m$ and thus cannot be connected thereto. When the shape of any one of the straightening plates 31 and 32 of the stator-vane structure 100 does not correspond to a combination of the vane type of the ventral face side stator vane 30 and the vane type of the dorsal face side stator vane 30, the straightening plate side connection portions 81, 91, 82, and 92 and the stator vane side connection portions 83, 93, 84, and 94 cannot be connected to one another. Thus, each of the plurality of straightening plates 31 and 32 cannot be assembled between the stator vanes 30 involving with a combination of non-corresponding shapes. From the description above, an erroneous assembly of the straightening plates 31 and 32 can be reliably prevented. Further, since the turbo fan engine 1 according to the embodiment employs the stator-vane structure 100 according to the embodiment, the same operation and effect can be obtained.

In the stator-vane structure 100 according to the embodiment, when the shapes of the ventral face side edge portions 61 and 71 of one straightening plates $31_n$ and $32_n$ are the same as the shapes of the ventral face side edge portions 61 and 71 of the other straightening plates $31_m$ and $32_m$, the positions of the first straightening plate side connection portions 81 and 91 of one straightening plates $31_n$ and $32_n$ and the other straightening plates $31_m$ and $32_m$ are the same as each other regardless of the shapes of the dorsal face side edge portions 62 and 72 of one straightening plates $31_n$ and $32_n$ and the shapes of the dorsal face side edge portions 62 and 72 of the other straightening plates $31_m$ and $32_m$. When the shapes of the dorsal face side edge portions 62 and 72 of one straightening plates $31_n$ and $32_n$ are the same as the shapes of the dorsal face side edge portions 62 and 72 of the other straightening plates $31_m$ and $32_m$, the positions of the second straightening plate side connection portions 82 and 92 of one straightening plates $31_n$ and $32_n$ and the other straightening plates $31_m$ and $32_m$ are the same as each other regardless of the shapes of the ventral face side edge portions 61 and 71 of one straightening plates $31_n$ and $32_n$ and the shapes of the ventral face side edge portions 61 and 71 of the other straightening plates $31_m$ and $32_m$. Accordingly, when any one of the shapes of the ventral face side edge portions 61 and 71 and the shapes of the dorsal face side edge portions 62 and 72 are common between one straightening plates $31_n$ and $32_n$ and the other straightening plates $31_m$ and $32_m$, the positions of the straightening plate side connection portions 81, 91, 82, and 92 corresponding thereto can be also commonly set. In this way, since the structures of the straightening plates 31 and 32 being partially common enables the components to be easily designed, and manufactured, and the like.

In the stator-vane structure 100 according to the embodiment, when the ventral face side stator vane $30_n$ for one straightening plates $31_n$ and $32_n$ is of one vane type and the ventral face side stator vane $30_m$ for the other straightening plates $31_m$ and $32_m$ is of the other vane type, the first straightening plate side connection portions 81 and 91 of the other straightening plates $31_m$ and $32_m$ are provided at a front side of the first straightening plate side connection portions 81 and 91 of one straightening plates $31_n$ and $32_n$. Further, when the dorsal face side stator vane $30_{n-1}$ for one straightening plates $31_n$ and $32_n$ is of one vane type and the dorsal face side stator vane $30_{m-1}$ for the other straightening plates $31_m$ and $32_m$ is of the other vane type, the second straightening plate side connection portions 82 and 92 of the other straightening plates $31_m$ and $32_m$ are provided at a rear side of the second straightening plate side connection portions 82 and 92 of one straightening plates $31_n$ and $32_n$. In this way, the deviation directions of the first straightening plate side connection portions 81 and 91 in response to the vane type of the ventral face side stator vane $30_n$ and the deviation directions of the second straightening plate side connection portions 82 and 92 in response to the vane type of the dorsal face side stator vane $30_{n-1}$ are opposite to each other in the front to rear direction. With such a configuration, it is possible to reduce a pattern in which a linear distance between the first straightening plate side connection portions 81 and 91 and the second straightening plate side connection portions 82 and 92 of one straightening plates $31_n$ and $32_n$ matches a linear distance between the first straightening plate side connection portions 81 and 91 and the second straightening plate side connection portions 82 and 92 of the other straightening plates $31_m$ and $32_m$ when the shapes of one straightening plates $31_n$ and $32_n$ are different from the shapes of the other straightening plates $31_m$ and $32_m$. Accordingly, an erroneous assembly of the straightening plate can be more reliably prevented.

Additionally, when the linear distances match each other, there is a possibility that the stator vane side connection portions 83, 93, 84, and 94 for one straightening plates $31_n$ and $32_n$ may be connected to the straightening plate side connection portions 81, 91, 82, and 92 of the other straightening plates $31_m$ and $32_m$ just by an excessive adjustment of the postures of the other straightening plates $31_m$ and $32_m$ during an assembly even when the shapes of one straightening plates $31_n$ and $32_n$ and the other straightening plates $31_m$ and $32_m$ are different from each other. Thus, since the relative positions do not match each other, an erroneous assembly can be more reliably prevented. Here, in the embodiment, when the shapes of one straightening plates $31_n$ and $32_n$ and the other straightening plates $31_m$ and $32_m$ are different from each other, the positions of the stator vane side connection portions 83, 93, 84, and 94 for one straightening plates $31_n$ and $32_n$ and the positions of the straightening plate side connection portions 81, 91, 82, and 92 of the other straightening plates $31_m$ and $32_m$ sufficiently deviate from each other. Thus, it is possible to sufficiently prevent an erroneous assembly even when the linear distances match each other by one straightening plates $31_n$ and $32_n$ and the other straightening plates $31_m$ and $32_m$. Thus, a combination in which the linear distances match each other may exist in the shape types of the straightening plates 31 and 32.

Here, if the above-described configuration is employed when both the ventral face side stator vane $30_n$ and the dorsal face side stator vane $30_{n-1}$ for one straightening plates $31_n$ and $32_n$ are of one vane type and both the ventral face side stator vane $30_m$ and the dorsal face side stator vane $30_{m-1}$ for the other straightening plates $31_m$ and $32_m$ are of the other vane type, it is possible to reliably prevent the linear distance of one straightening plates $31_n$ and $32_n$ and the linear distance of the other straightening plates $31_m$ and $32_m$ from matching each other. That is, it is possible to reliably prevent a problem in which the other straightening plates $31_m$ and $32_m$ are erroneously assembled to the assembly positions of one straightening plates $31_n$ and $32_n$. Specifically, in the first shape LT1 (IET1, OET1), the fifth shape LT5 (IET2, OET2), the eighth shape LT8 (IET3, OET3), the eleventh shape LT11 (IET4, OET4), and the thirteenth shape LT13 (IET5, OET5), the linear distances of the through-holes 81a and 91a and the through-holes 82a and 92a are all different. In this way, although there are a plurality of types (five types) of the straightening plates 31 and 32 in which the ventral face side vane type and the dorsal face side vane type are the same as each other, an erroneous assembly in the types can be reliably prevented.

For example, the stator-vane structure 100A shown in FIG. 7(a) is provided with a zone in which a plurality of lines of the stator vane 30 of the third vane type VT3 are continuously provided, a zone in which a plurality of lines of the stator vane 30 of the first vane type VT1 are continuously provided, and a zone in which a plurality of lines of the stator vane 30 of the second vane type VT2 are continuously provided. In such a part, there are a plurality of straightening plates 31 and 32 in which the ventral face side vane type is the same as the dorsal face side vane type as in the first shape LT1 (IET1, OET1), the fifth shape LT5 (IET2, OET2), and the eighth shape LT8 (IET3, OET3). Meanwhile, there a small number (a pair) of straightening plates 31 and 32 in which the ventral face side vane type and the dorsal face side vane type are different from each other as in the seventh shape LT7 (IET3, OET1) and the second shape LT2 (IET1, OET2). That is, there is a case in which the number of the straightening plates 31 and 32 in which the ventral face side vane type and the dorsal face side vane type are the same as each other is larger than the number of the straightening plates 31 and 32 in which the ventral face side vane type and the dorsal face side vane type are different from each other. In this case, for example, the number of chances in which an operator confuses the first shape LT1 (IET1, OET1) with the eighth shape LT8 (IET3, OET3) is larger than the number of chances in which the operator confuses the first shape LT1 (IET1, OET1) with the seventh shape LT7 (IET3, OET1). From the description above, since an erroneous assembly between the straightening plates 31 and 32 in which the ventral face side vane type and the dorsal face side vane type are the same as each other can be reliably prevented by the above-described structure, an erroneous assembly in the entire work can be more reliably prevented.

In the stator-vane structure 100 according to the embodiment, the first stator vane side connection portions 83 and 93 and the second stator vane side connection portions 84 and 94 are respectively provided with the bolt holes 83a, 93a, 84a, and 94a and the first straightening plate side connection portions 81 and 91 and the second straightening plate side connection portions 82 and 92 are respectively provided with the through-holes 81a, 91a, 82a, and 92a. With such a structure, when the through-holes 81a, 91a, 82a, and 92a of the straightening plate side connection portions 81, 91, 82, and 92 respectively communicate with the bolt holes 83a, 93a, 84a, and 94a of the stator vane side connection portions 83, 93, 84, and 94 and bolts are fastened to the bolt holes 83a, 93a, 84a, and 94a through the through-holes 81a, 91a, 82a, and 92a, the straightening plates 31 and 32 are assembled to the stator vane 30. Further, since the bolts cannot be fastened only by the deviation of the positions of the bolt holes 83a, 93a, 84a, and 94a with respect to the positions of the through-holes 81a, 91a, 82a, and 92a, the straightening plate side connection portions 81, 91, 82, and 92 cannot be connected to the stator vane side connection portions 83, 93, 84, and 94. In this way, an erroneous assembly of the straightening plates 31 and 32 can be prevented by a simple configuration.

In the stator-vane structure 100 according to the embodiment, each of the plurality of stator vanes 30 is provided with the stator vane side identification portion MK1 used to visually recognize the vane type of the stator vane 30. Further, each of the plurality of straightening plates 31 and 32 is provided with the straightening plate side identification portion MK2 used to visually recognize the vane type of the ventral face side stator vane 30 and the vane type of the dorsal face side stator vane 30. With such a structure, an operator can easily determine whether the straightening plates 31 and 32 corresponding to engagement targets have correct shapes just by seeing the straightening plate side identification portion MK2 and the stator vane side identification portion MK1.

While the embodiment of the disclosure has been described in detail, the disclosure is not limited to the above-described embodiment. For example, the shapes of the stator vane, the fixed portion, the straightening plate, and the like according to the above-described embodiment are merely examples and may be appropriately changed without departing from the spirit of the disclosure. In the above-described embodiment, the stator-vane structure includes the stator vanes of five vane types, but two or more vane types may be employed. Further, only the trailing edge side shape of the stator vane changes in response to the vane type, but the leading edge side shape may change. Further, the fixed portion includes the protrusion portion which protrudes in the circumferential direction from the end portion of the stator vane, but any configuration may be employed as long as the stator vane can be fixed to the case. For example, a structure may be employed in which a bolt or the like is fastened to the end portion of the stator vane in the longitudinal direction from the outside of the case. Further, the stator vane side connection portion is formed at the front end of the protrusion portion of the fixed portion (the fixed bracket), but the formation position is not particularly limited. For example, the stator vane side connection portion may be formed at the elongated portion. Further, the stator vane side connection portion may be formed in such that the protrusion portion is widened and the bolt hole is formed at a part of the protrusion portion. Further, the stator vane side connection portion may not be formed at the fixed portion and may be directly formed at the stator vane. Further, one straightening plate may be provided with a plurality of first straightening plate side connection portions or a plurality of second straightening plate side connection portions. Further, an erroneous assembly preventing structure of the first stator vane side connection portion is applied to both end portions of the stator vane at the outer circumferential side and the inner circumferential side, but may be applied to at least one side.

Further, the straightening plate side connection portion and the stator vane side connection portion are fastened to each other by the through-hole and the bolt hole, but any structure may be employed as long as the connection therebetween is guaranteed. For example, a bolt may be formed at the stator vane side connection portion in advance and a through-hole may be formed at the straightening plate side connection portion. In this case, when the straightening plate is attached while the bolt is inserted into the through-hole and a nut is fastened from a front end of the bolt, the straightening plate is assembled. Further, the stator vane side connection portion may be provided with the through-hole instead of the bolt hole. In this case, a bolt is inserted into the through-hole of the straightening plate side connection portion and the through-hole of the stator vane side connection portion and a nut is fastened from a front end of the bolt.

Further, in the above-described embodiment, when the vane type of one stator vane is the same as the vane type of the other stator vane, the position of the stator vane side connection portion for one stator vane and the position of the stator vane side connection portion for the other stator vane are uniform. However, in a combination of the vane type of the first stator vane and the vane type of the second stator vane for one straightening plate, the position of the stator vane side connection portion for each stator vane may be different even in the same vane type as long as a different type of a straightening plate is not erroneously assembled. Accordingly, even when the shape of the first (second) edge of one straightening plate and the shape of the ventral face side (dorsal face side) edge of the other straightening plate are the same as each other, the positions of the first (second) straightening plate side connection portions of one straightening plate and the other straightening plate may be different from each other. Here, from the viewpoint of common components, the position of the stator vane side connection portion may be uniform in the case of the same vane type.

REFERENCE SIGNS LIST 1 turbo fan engine
2 inner case (casing)
3 compressor
4 core engine
6 fan
7 outer case
21 rotor vane
30 stator vane
31 outer straightening plate
32 inner straightening plate
30a, 30b end portion
30c ventral face
30d dorsal face
61, 71 ventral face side edge portion
62, 72 dorsal face side edge portion
81, 91 first straightening plate side connection portion
82, 92 second straightening plate side connection portion
81a, 82a, 91a, 92a through-hole
83, 93 first stator vane side connection portion
84, 94 second stator vane side connection portion
83a, 84a, 93a, 94a bolt hole
100 stator-vane structure

The invention claimed is:
1. A stator-vane structure comprising:
a plurality of stator vanes which are fixed to a case of a turbo fan engine at an end portion in a longitudinal direction and are disposed at an interval; and
a plurality of straightening plates which are disposed among the plurality of stator vanes to face the case at a side of the end portion,
wherein the plurality of stator vanes include two or more types of blades each having a different vane type,
wherein each of the plurality of straightening plates includes a ventral face side edge portion which follows a ventral face of a first stator vane at a first adjacent side, a dorsal face side edge portion which follows a dorsal face of a second stator vane at a second adjacent side, a first straightening plate side connection portion which is connected to the first stator vane, and a second straightening plate side connection portion which is connected to the second stator vane,
wherein each of the plurality of stator vanes includes a first stator vane side connection portion which is provided at a position corresponding to the first straightening plate side connection portion at a side of the ventral face and is connected to the first straightening plate side connection portion and a second stator vane side connection portion which is provided at a position corresponding to the second straightening plate side connection portion at a side of the dorsal face and is connected to the second straightening plate side connection portion,
wherein, when a combination of a vane type of the first stator vane and a vane type of the second stator vane for a first straightening plate is same as a combination of a vane type of the first stator vane and a vane type of the second stator vane for a second straightening plate, positions of the first straightening plate side connection portions of the first straightening plate and the second straightening plate are same as each other and positions of the second straightening plate side connection portions of the first straightening plate and the second straightening plate are same as each other, and
wherein, when the combination of the vane type of the first stator vane and the vane type of the second stator vane for the first straightening plate is different from the combination of the vane type of the first stator vane and the vane type of the second stator vane for the second straightening plate, at least one of the positions of the first straightening plate side connection portions of the first straightening plate and the second straightening plate and the positions of the second straightening plate side connection portions of the first straightening plate and the second straightening plate are different from each other.

2. The stator-vane structure according to claim 1,
wherein when a shape of the ventral face side edge portion of the first straightening plate is same as a shape of the ventral face side edge portion of the second straightening plate, positions of the first straightening plate side connection portions of the first straightening plate and the second straightening plate are same as each other regardless of a shape of the dorsal face side edge portion of the first straightening plate and a shape of the dorsal face side edge portion of the second straightening plate, and
wherein when the shape of the dorsal face side edge portion of the first straightening plate is same as the shape of the dorsal face side edge portion of the second straightening plate, positions of the second straightening plate side connection portions of the first straightening plate and the second straightening plate are same as each other regardless of the shape of the ventral face side edge portion of the first straightening plate and the shape of the ventral face side edge portion of the second straightening plate.

3. The stator-vane structure according to claim 1,
wherein the first straightening plate side connection portion is provided at any one of a front side and a rear side of the turbo fan engine and the second straightening plate side connection portion is provided at any one of the front side and the rear side thereof,
wherein when the first stator vane for the first straightening plate is of a first vane type and the first stator vane for the second straightening plate is of a second vane type, the first straightening plate side connection portion of the second straightening plate is provided at a front side of the first straightening plate side connection portion of the first straightening plate, and
wherein when the second stator vane for the first straightening plate is of the first vane type and the second stator vane for the second straightening plate is of second vane type, the second straightening plate side connection portion of the second straightening plate is provided at a rear side of the second straightening plate side connection portion of the first straightening plate.

4. The stator-vane structure according to claim 1,
wherein each of the first stator vane side connection portion and the second stator vane side connection portion is provided with a bolt hole and each of the first straightening plate side connection portion and the second straightening plate side connection portion is provided with a through-hole.

5. The stator-vane structure according to claim 1,
wherein each of the plurality of stator vanes is provided with a stator vane side identification portion used to visually recognize the vane type, and
wherein each of the plurality of straightening plates is provided with a straightening plate side identification portion used to visually recognize the vane type of the first stator vane and the vane type of the second stator vane.

6. A turbo fan engine comprising:
a core engine which includes a compressor provided inside an inner case;
a fan which is provided at a front part of the compressor;
an outer case which accommodates the core engine and the fan;
a stator-vane structure which is provided between the outer case and the inner case downstream of a rotor vane of the fan and straightens a flow of a gas bypassing the core engine,
wherein the stator-vane structure according to claim 1 is provided as the stator-vane structure.

* * * * *